United States Patent
Barish

(10) Patent No.: US 10,956,984 B2
(45) Date of Patent: Mar. 23, 2021

(54) SYSTEMS AND METHODS FOR AGGREGATING AND VISUALLY REPORTING INSURANCE CLAIMS DATA

(71) Applicant: Phillip H. Barish, Algonquin, IL (US)

(72) Inventor: Phillip H. Barish, Algonquin, IL (US)

( * ) Notice: Subject to any disclaimer, the term of this patent is extended or adjusted under 35 U.S.C. 154(b) by 0 days.

(21) Appl. No.: 16/536,888

(22) Filed: Aug. 9, 2019

(65) Prior Publication Data
US 2020/0051173 A1 Feb. 13, 2020

Related U.S. Application Data

(60) Provisional application No. 62/717,792, filed on Aug. 11, 2018.

(51) Int. Cl.
*G06Q 40/08* (2012.01)
*G06Q 20/10* (2012.01)
*G06F 16/955* (2019.01)

(52) U.S. Cl.
CPC ......... *G06Q 40/08* (2013.01); *G06F 16/9558* (2019.01); *G06Q 20/10* (2013.01)

(58) Field of Classification Search
CPC .................................................... G06Q 40/00
USPC .......................................................... 705/35
See application file for complete search history.

(56) References Cited

U.S. PATENT DOCUMENTS

| | | | | |
|---|---|---|---|---|
| 6,324,516 B1 * | 11/2001 | Shults | ................... | G06F 19/328 705/2 |
| 6,535,855 B1 * | 3/2003 | Cahill | ................... | G06Q 20/00 340/540 |
| 6,826,536 B1 * | 11/2004 | Forman | ................. | G06F 19/328 705/3 |
| 6,934,692 B1 * | 8/2005 | Duncan | ................. | G06Q 20/10 705/14.4 |
| 7,340,401 B1 * | 3/2008 | Koenig | ................. | G06F 19/328 600/300 |
| 7,356,460 B1 | 4/2008 | Kennedy | | |

(Continued)

FOREIGN PATENT DOCUMENTS

WO 2020/036826 A1 2/2020

OTHER PUBLICATIONS

FileHandler Enterprise www.jwsoftware.com/filehandler-enterprise/.
(Continued)

*Primary Examiner* — Kirsten S Apple
(74) *Attorney, Agent, or Firm* — Patents and Licensing LLC; Daniel W. Juffernbruch

(57) ABSTRACT

Systems and methods are described for use in the context of property insurance claims. In general, the systems and methods described herein allow for a claims adjuster to visually present property insurance claim decisions input into a server by a claims adjuster audit by a policy holder of a property insurance policy. A payment list illustrating a plurality of payments with hyperlinks is displayed in a first view on a display screen of a policy holder device. An itemized statement of loss illustrating a replacement cost value and subtractions therefrom in a second view on the display screen. An itemization of coverage illustrating a list of property items with associated damages corresponding to each of the property items in a third view on the display screen, wherein only a subset of the property items with associated damages are listed that correspond to a selected hyperlink.

22 Claims, 17 Drawing Sheets

(56) References Cited

U.S. PATENT DOCUMENTS

| | | | |
|---|---|---|---|
| 7,356,516 B2* | 4/2008 | Richey | G06Q 10/087 |
| | | | 705/80 |
| 7,395,219 B2* | 7/2008 | Strech | G06Q 40/08 |
| | | | 705/4 |
| 7,430,514 B1 | 9/2008 | Childress et al. | |
| 7,467,094 B2* | 12/2008 | Rosenfeld | G06Q 30/04 |
| | | | 705/3 |
| 7,657,441 B2* | 2/2010 | Richey | G06Q 10/087 |
| | | | 705/1.1 |
| 7,668,738 B2 | 2/2010 | Wiggins | |
| 7,729,930 B1* | 6/2010 | Bohanek | G06Q 10/0875 |
| | | | 705/14.72 |
| 7,856,617 B2 | 12/2010 | Szlam | |
| 7,941,330 B1* | 5/2011 | Buentello | G06Q 40/08 |
| | | | 705/4 |
| 7,953,615 B2 | 5/2011 | Aquila | |
| 8,015,036 B1 | 9/2011 | Leisure | |
| 8,065,168 B2 | 11/2011 | Szlam | |
| 8,140,418 B1* | 3/2012 | Casey | G06Q 20/10 |
| | | | 370/401 |
| 8,185,463 B1* | 5/2012 | Ball | G06Q 40/00 |
| | | | 705/36 R |
| 8,311,941 B2* | 11/2012 | Grant | G06Q 20/102 |
| | | | 705/40 |
| 8,355,930 B2 | 1/2013 | Tholl | |
| 8,478,769 B2 | 7/2013 | Goldfarb | |
| D764,461 S * | 8/2016 | Romanoff | D14/358 |
| 9,892,463 B1* | 2/2018 | Hakimi-Boushehri | |
| | | | G06Q 40/08 |
| 9,928,553 B1* | 3/2018 | Harvey | G06K 9/00637 |
| 10,269,074 B1* | 4/2019 | Patel | G06Q 40/08 |
| 10,387,960 B2* | 8/2019 | Tofte | G06Q 10/06 |
| 2003/0028404 A1 | 2/2003 | Herron et al. | |
| 2003/0078816 A1 | 4/2003 | Filep | |
| 2003/0233292 A1* | 12/2003 | Richey | G06Q 10/087 |
| | | | 705/28 |
| 2004/0153382 A1* | 8/2004 | Boccuzzi | G06Q 30/04 |
| | | | 705/34 |
| 2005/0197933 A1* | 9/2005 | Ullom | G06Q 40/00 |
| | | | 705/35 |
| 2006/0271456 A1* | 11/2006 | Romain | G06Q 20/3674 |
| | | | 705/35 |
| 2007/0282639 A1 | 12/2007 | Leszuk et al. | |
| 2008/0059351 A1* | 3/2008 | Richey | G06Q 10/087 |
| | | | 705/35 |
| 2009/0265193 A1* | 10/2009 | Collins | G06Q 30/0185 |
| | | | 705/4 |
| 2010/0027777 A1* | 2/2010 | Gupta | H04M 3/42195 |
| | | | 379/210.01 |
| 2010/0145734 A1 | 6/2010 | Becerra | |
| 2010/0332265 A1* | 12/2010 | Smith | G06Q 30/02 |
| | | | 705/4 |
| 2011/0173122 A1* | 7/2011 | Singhal | G06Q 20/32 |
| | | | 705/44 |
| 2011/0213628 A1* | 9/2011 | Peak | G06Q 40/08 |
| | | | 705/4 |
| 2011/0218827 A1* | 9/2011 | Kenefick | G06Q 40/08 |
| | | | 705/4 |
| 2011/0238564 A1* | 9/2011 | Lim | G06Q 20/3223 |
| | | | 705/38 |
| 2011/0276489 A1* | 11/2011 | Larkin | G06Q 20/20 |
| | | | 705/44 |
| 2012/0046973 A1* | 2/2012 | Eshleman | G06Q 30/02 |
| | | | 705/4 |
| 2012/0047072 A1* | 2/2012 | Larkin | G06Q 20/02 |
| | | | 705/44 |
| 2012/0066005 A1* | 3/2012 | Stewart | G06Q 30/0282 |
| | | | 705/4 |
| 2012/0109693 A1* | 5/2012 | Smith | G06Q 20/204 |
| | | | 705/4 |
| 2012/0116820 A1* | 5/2012 | English | H04L 61/2007 |
| | | | 705/4 |
| 2012/0143634 A1 | 6/2012 | Beyda et al. | |
| 2012/0275651 A1* | 11/2012 | Brown | G06K 9/0063 |
| | | | 382/103 |
| 2012/0330690 A1* | 12/2012 | Goslinga | G06Q 40/00 |
| | | | 705/4 |
| 2013/0073321 A1* | 3/2013 | Hofmann | G06Q 10/10 |
| | | | 705/4 |
| 2013/0166325 A1* | 6/2013 | Ganapathy | G06Q 40/08 |
| | | | 705/4 |
| 2013/0297353 A1* | 11/2013 | Strange | G06Q 40/08 |
| | | | 705/4 |
| 2013/0304514 A1* | 11/2013 | Hyde | G06Q 40/08 |
| | | | 705/4 |
| 2013/0317861 A1* | 11/2013 | Tofte | G06Q 40/08 |
| | | | 705/4 |
| 2014/0058854 A1* | 2/2014 | Ranganath | G06Q 20/4016 |
| | | | 705/16 |
| 2014/0122133 A1* | 5/2014 | Weisberg | G06Q 40/08 |
| | | | 705/4 |
| 2014/0257871 A1* | 9/2014 | Christensen | G06Q 40/00 |
| | | | 705/4 |
| 2014/0282639 A1 | 9/2014 | Zerbib | |
| 2014/0310162 A1* | 10/2014 | Collins | G06F 3/04842 |
| | | | 705/39 |
| 2015/0032480 A1* | 1/2015 | Blackhurst | G06Q 40/08 |
| | | | 705/4 |
| 2015/0088557 A1 | 3/2015 | Huynh | |
| 2015/0178850 A1 | 6/2015 | Machnicki | |
| 2015/0187019 A1* | 7/2015 | Fernandes | G06Q 40/08 |
| | | | 705/4 |
| 2016/0125548 A1* | 5/2016 | Bowles | G06Q 10/30 |
| | | | 705/4 |
| 2016/0171627 A1* | 6/2016 | Lyubarskiy | G06Q 40/12 |
| | | | 705/30 |
| 2017/0193605 A1* | 7/2017 | Narendran | G06Q 40/08 |
| 2018/0373931 A1* | 12/2018 | Li | G06K 9/00637 |

OTHER PUBLICATIONS

Capterra Claims Processing Software www.capterra.com/claims-processing-software/.

Best Insurance Claims Management Software www.g2.com/categories/insurance-claims-management/.

International search report in corresponding WO2020036826, pp. 1-2, dated Nov. 8, 2019.

Written Opinion in corresponding WO2020036826, pp. 1-5, dated Nov. 8, 2019.

* cited by examiner

Building

Coverage Amount: $500,000.00
Coverage Deductible: $1,000.00

Valuation:
Estimate of Loss:

Unused Deductible: $0.00

*Depreciation*

*Deductible Shared With:*

| | |
|---|---|
| R.C.V.: | $285,214.54 |
| Depreciation*: | $55,718.00 |
| A.C.V.: | $229,496.54 |
| Residual Deductible: | ($1,000.00) |
| Subtotal: | $228,496.54 |
| Less Amount Over Limit: | $0.00 |
| Less Advances**: | $50,000.00 |
| Less Prior Payments**: | $168,000.80 |
| Current Claim Payable: | $10,495.74 |
| Recoverable: | $52,430.31 |
| Non Recoverable: | $3,287.69 |
| Max. Payable: | $62,926.05 |

FIG. 3

| Building | Replacement Cost | Recoverable Depreciation | Non-Recoverable Depreciation | ACV |
|---|---|---|---|---|
| Adjuster's Estimate -- PB 1.13.16 | $210,565.36 | $41,564.56 | | $169,000.80 |
| HVAC sub bid -- Proficient Heating & AC | $22,000.00 | $5,500.00 | | $16,500.00 |
| Plumbing sub bid - #1 Above-Water Plumbing | $8,645.56 | $1987.41 | | $6,658.15 |
| Emergency clean up supplies -- Ace Hardware Rcpt | $265.41 | | | $265.41 |
| Mitigation Services -- On Time Disaster Cleanup | $12,564.89 | | | $12,564.89 |
| South elevation awnings -- Metro Awning | $7598.55 | | $2,645.56 | $5,053.00 |
| Concrete sub bid -- Breakman Concrete | $4,265.96 | $1,121.35 | | $3,144.62 |
| Fire Extinguishers -- Ace Hardware Rcpt | $356.45 | | | $356.45 |
| Owner's staff clean up labor: 32 Man Hrs @ 18.00 | $576.00 | | | $576.00 |
| Warehouse light fixtures -- per Aurora lighting | $2645.78 | | | $2645.78 |
| Multiple Receipt group -- Temp repairs as submitted | $564.45 | | | $564.45 |
| Electrical sub bid -- Proton Electric | $9,875.63 | $2,255.98 | | $7,619.65 |
| Multiple Receipt group -- Parts for hoist | $798.54 | | | $798.54 |
| Hoist repair labor: 12 Hrs @ 95.56 | $1,146.72 | | | $1,146.72 |
| Adjuster's Supplement Estimate -- BB 1-20-15 | $3,245.21 | | $642.13 | $2,603.08 |
| | | | | $0.00 |
| | | | | $0.00 |
| | | | | $0.00 |
| | | | | $0.00 |
| | | | | $0.00 |
| | | | | $0.00 |
| | | | | $0.00 |
| | | | | $0.00 |
| | | | | $0.00 |
| | | | | $0.00 |
| | | | | $0.00 |
| | | | | $0.00 |
| Total | $285,214.54 | $52,430.31 | $3,287.69 | $229,496.54 |

Building
Amount: $200,000.00
Deductible: $1,000.00

Deductible Shared with:

R.C.V.: $285,230.54
Depreciation*: $55,718.00
A.C.V.: $229,496.54
Residual Deductible: $1,000.00
Sub-total: $228,496.54
Less Amount Over Limit: $0.00
Less Advances**: $60,000.00
Less Prior Payments**: $168,000.80

Current Claim Payable: $10,495.74

Recoverable: $52,430.31
Non-Recoverable: $3,287.69
Max Payable: $60,926.85

Claim No. ST1-3658876 | Insured: Scott Terrier

Document Description: Plumbing sub bid - #1 Above-Water Plumbing

Coverage: Building ▼   Room/Location: Living Room ▼   Trade/Category: Plumbing ▼

Add

Calculation Description: Cust. bar sink & fixts

| Replacement Cost | Sales Tax | Recoverable Depreciation | Non-Recoverable Depreciation | ACV | Current Depreciation Payable | Remaining Recoverable Depreciation |
|---|---|---|---|---|---|---|
| $645.56 | ☐ | $168.45 | ☐ | $477.11 | | $168.45 |

Insert  
Remove

Calculation Description: Rough-in for all rooms

| Replacement Cost | Sales Tax | Recoverable Depreciation | Non-Recoverable Depreciation | ACV | Current Depreciation Payable | Remaining Recoverable Depreciation |
|---|---|---|---|---|---|---|
| $8,000.00 | ☐ | $1,818.96 | ☐ | $6,181.04 | | $1,818.96 |
| $8,645.56 | | $1,987.41 | | $6,658.15 | | $1,987.41 |

Insert  
Remove  
Add

TOTAL: $8,645.56

Notes:

SYSTEMS AND METHODS FOR AGGREGATING AND VISUALLY REPORTING INSURANCE CLAIMS DATA

CROSS-REFERENCE TO RELATED APPLICATIONS

The present invention claims priority to U.S. Provisional Pat. App. No. 62/717,792, titled "Systems and Methods for Collecting, Aggregating and Reporting Insurance Claims Data," filed Aug. 11, 2018, which is incorporated herein by reference in its entirety.

TECHNICAL FIELD

This disclosure relates to systems and methods for collecting, aggregating, preparing and reporting data. In particular, this disclosure relates to systems and methods for documenting claims data, performing necessary calculations and determinations relating to a claim and presenting, or making claims data available in a universally accessible format.

BACKGROUND

Processing insurance claims can be a long, arduous and complicated process. Claims adjusters typically evaluate insurance claims, decide whether a claim is valid and, if it is, determine a payment amount to a benefactor. Adjusters may negotiate settlements, authorize payments, contact involved persons, experts and contractors and perform other such activities.

The amount of data that may be required to document, settle and process even minor claims can be quite large. When a person or company submits voluminous documentation for a given claim, the amount of work for the adjuster can increase exponentially.

Although adjusters typically work within the parameters of a known insurance policy and utilize industry formulas to determine settlements and authorize payments, the process can appear quite complex to the policy holder. Obtaining certain desired information regarding a claim can itself be arduous, such as detailed reconciliation of payments, claim itemization and document listings. Accordingly, development of a system and method providing a simple, intuitive interface for collecting claims data, and providing fast access to detailed, standardized reports and selected information from those data is an unmet property insurance industry need. Such a system can substantially increase productivity, create an enhanced policy-holder experience and decrease loss adjustment expense.

SUMMARY

Systems and methods are described for use in the context of insurance claims, in particular, property insurance claims. In general, the systems and methods described herein allow for a claims adjuster to easily and quickly import claim information into the system automatically, e.g., through the use of scanning documents and applying optical character recognition, or manually. The claim documentation can be automatically scanned with optical character recognition immediately upon uploading it into the system. The adjuster can then enter any necessary data pertinent to only those pages (or other uploaded file types) into fields which can be used for various calculations pertaining to the insurance claim and for recall use in displaying the origins and supporting documentation of claim payouts. In an exemplary aspect, a claims adjuster can forwardly enter policy and loss information ultimately leading to one or more claim payouts; the policy holder or the claims adjuster can, in a reverse fashion, retrieve detailed information that lead to the determination of the payout.

Such systems and methods are advantageous in at least that they provide quick, intuitive and relatively simple entry of claims information and with which the system automatically generates reports and other standard and non-standard documents as well as a comprehensive digitally linked audit capability, thereby providing complete transparency for the policy holder and the claims adjuster. The policy holder and the claims adjuster can then quickly and easily access and view the data, documents and procedures used to calculate each payout.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

To this end, in an embodiment of the present invention, a method for managing an insurance claim is provided. The method comprises: uploading a visual representation of at least one document to a computing device comprising a visual display, the document pertaining to an insurance claim for an item, said document comprising at least one claim data value; extracting said at least one claim data value from said document, digitally storing said value and using said value to determine a claim payout amount; providing a first interactive page to be displayed on the visual display comprising said claim payout amount as a payout hyperlink; and activating said payout hyperlink on the first interactive page causing a second interactive page to be displayed on said visual display that includes payout data derived from the claim payout amount as a payout data hyperlink.

In an embodiment, activating the payout data hyperlink on the second interactive page causes a third interactive page to be displayed on the visual display.

In an embodiment, the third interactive page comprises the visual representation of the document.

In an embodiment, the payout data hyperlink comprises the claim data value extracted from the document.

In an embodiment, the payout data hyperlink comprises data derived from the claim data value extracted from the document.

In an embodiment, the method comprises the steps of: entering coverage information into the computing device corresponding to the item; and automatically calculating claim payout amount using the coverage information.

In an embodiment, the method further comprises the step of: displaying on the first interactive page a first field containing a statement of loss for the item, wherein the statement of loss comprises loss data derived from the claim data value wherein the loss data is displayed as a loss data hyperlink.

In an embodiment, the statement of loss comprises the payout amount as the payout hyperlink.

In an embodiment, the method further comprises the step of: displaying on the first interactive page a second field containing an itemization list for the item, wherein the itemization list comprises at least one itemization of coverage of the item based on the claim data value extracted from the document.

In an embodiment, the itemization of coverage is displayed as an itemization hyperlink, wherein activating said itemization hyperlink causes a fourth interactive page to be displayed that includes the visual representation of the document.

In an embodiment, the method further comprises the step of: displaying on the first interactive page a button, wherein the button corresponds to a date of payout, wherein selecting the button on the first interactive page stores the first interactive page and all data contained thereon.

In an embodiment, the method further comprises the step of: displaying on the first interactive page a prior payment field, wherein a prior payment hyperlink is displayed, wherein selecting the prior payment hyperlink displays payout information about the item stored on the date of the prior payment.

In an embodiment, the method further comprises the step of: displaying on the first interactive page a sub-coverages field, wherein at least one sub-coverage of the item is displayed as a sub-coverage hyperlink, wherein selecting the sub-coverage hyperlink displays sub-coverage information relating to the item.

In an embodiment, the first interactive page comprises a list selected from the group consisting of a payment list and an items list.

In an alternate embodiment of the present invention, a system for displaying information concerning an insurance claim for an item is provided. The system comprises: a first interactive page displayed on a visual display of a computing device, the first interactive page comprising a first field containing a statement of loss for the item and further comprises an insurance claim payout amount as a payout hyperlink, wherein activating the payout hyperlink on the first interactive page causes a second interactive page to be displayed on the visual display that includes payout data derived from the claim payout amount as a payout data hyperlink; a second field on the first interactive page displayed on the visual display containing an itemization list for the item, wherein the itemization list comprises at least one itemization of coverage of the item is based on the claim data value extracted from a document, the itemization of coverage displayed as an itemization of coverage hyperlink; and a payout button on the first interactive page displayed on the visual display, wherein the button corresponds to a date of payout, wherein selecting the button on the first interactive page stores the first interactive page and all data contained thereon.

In an embodiment, the system further comprises: a sub-coverages field on the first interactive page displayed on the visual display, wherein at least one sub-coverage of the item is displayed as a sub-coverage hyperlink, wherein selecting the sub-coverage hyperlink displays sub-coverage information relating to the item.

In an embodiment, activating the payout data hyperlink causes a visual representation of a document to be displayed on the visual display, wherein the payout amount is derived from information on the document.

In an embodiment, selecting the itemization of coverage hyperlink causes a third interactive page to be displayed on the visual display.

In an embodiment, the third interactive page comprises itemization data displayed as an itemization data hyperlink.

In an embodiment, selecting the itemization data hyperlink causes a visual representation of the document to be displayed on the visual display.

In an embodiment, the system further comprises: an icon associated with the statement of loss in the first field, the icon configured to provide a pop-up box to appear on the display device containing an explanation of data within the statement of loss.

In an embodiment, the statement of loss in the first field comprises a prior payments line item, wherein the prior payments line item comprises a prior payments hyperlink configured to display past payments data on a second interactive page on the display when clicked.

In an embodiment, the past payments data comprises at least one past payments hyperlink configured to display detailed information about a past payment on a third interactive page on the display when clicked.

The foregoing summary is illustrative only and is not intended to be in any way limiting. In addition to the illustrative aspects, embodiments, and features described above, further aspects, embodiments, and features will become apparent by reference to the drawings and the following detailed description and claims.

DESCRIPTION OF DRAWINGS

The present embodiments are illustrated by way of the figures of the accompanying drawings, which may not necessarily be to scale, in which like references indicate similar elements, and in which:

FIG. 3 is an illustrative screen snapshot showing loss data pertaining to a fictitious building, according to one embodiment;

FIG. 4 is an exemplary screen snapshot of example loss data according to one embodiment;

FIG. 5 is an exemplary screen view of details of a loss component, according to one embodiment;

FIG. 6 is an exemplary screen view of supporting documentation and loss amounts that cooperatively form a Document Description Set according to one embodiment;

FIG. 8 illustrates an exemplary screen snapshot of an interface for adding claim coverage and parameters into the system and for monitoring the status of a particular claim coverage;

FIG. 9 illustrates an exemplary screen snapshot of an interface for adding additional claim coverage and parameters into the system;

FIG. 10 illustrates an exemplary screen snapshot of an interface for adding claim coverage and parameters into the system;

FIG. 13 illustrates an exemplary screen snapshot showing itemized losses of a claim, according to one embodiment;

FIG. 15 illustrates origin data of one of the payouts shown in FIG. 14, according to one embodiment; and FIG. 16 illustrates an exemplary screen snapshot of aggregated claim loss data pertaining to a claim payout, according to one embodiment.

DETAILED DESCRIPTION OF ILLUSTRATIVE EMBODIMENTS

In one exemplary aspect, a system and method are disclosed for automating claims processing. For the purpose of this disclosure, 'claims processing' is discussed in the context of property claims processing; however, it should be understood that the systems and methods described herein can be applied to other types of claims and data processing. In general, according to one embodiment, automating claims processing can be accomplished by consolidating required tasks of the claim representative and providing the customer or benefactor with a guided "click-path" by which they can clearly audit any component of a claim payment, such as being guided through each determinative step of a given claim calculation. A click-path, in the context of a website or other, similar computer interface, can represent a series of successive mouse clicks on hyperlinks or similar commands that leads a user to a data element or data set of desired information. The data element or data set can be dependent on the granularity of stored data within the system.

In a general example, a property claims adjuster can input certain required data corresponding to a property claim into the system. In past approaches, the adjuster may have had to input such data multiple times during the course of processing a claim; however, the systems and methods described herein allow the adjuster to enter such information only once.

Redundancies are practically eliminated through the intelligent storage and retrieval of inputted data. Continuing, the system can perform known or custom calculations to determine certain aspects of the claim, for example, whether the claim is authorized, claim payout amounts, etc. The results of such calculations and determinations can be used to populate fields in a benefactor portal in such a way as to provide the benefactor the ability to retrieve data at a desired level of granularity. The benefactor portal can be presented, for example, as a website having secure access for the benefactor that is accessible on the Internet or, alternatively, on an intranet.

In one non-limiting example, the benefactor portal can include a list of payouts pertaining to one or more claims, wherein the dollar amounts of each of the payouts are presented as functional links (e.g., hyperlinks) to stored data pertaining to the payout, including, but not limited to data that was used to determine the amount of the payout, invoices, estimates and other data. In general, the systems and methods described herein can provide indexing and recall of all claim components to simplify the management of claims, from complex commercial claims to personal (i.e., single-person) claims.

Figure 1:
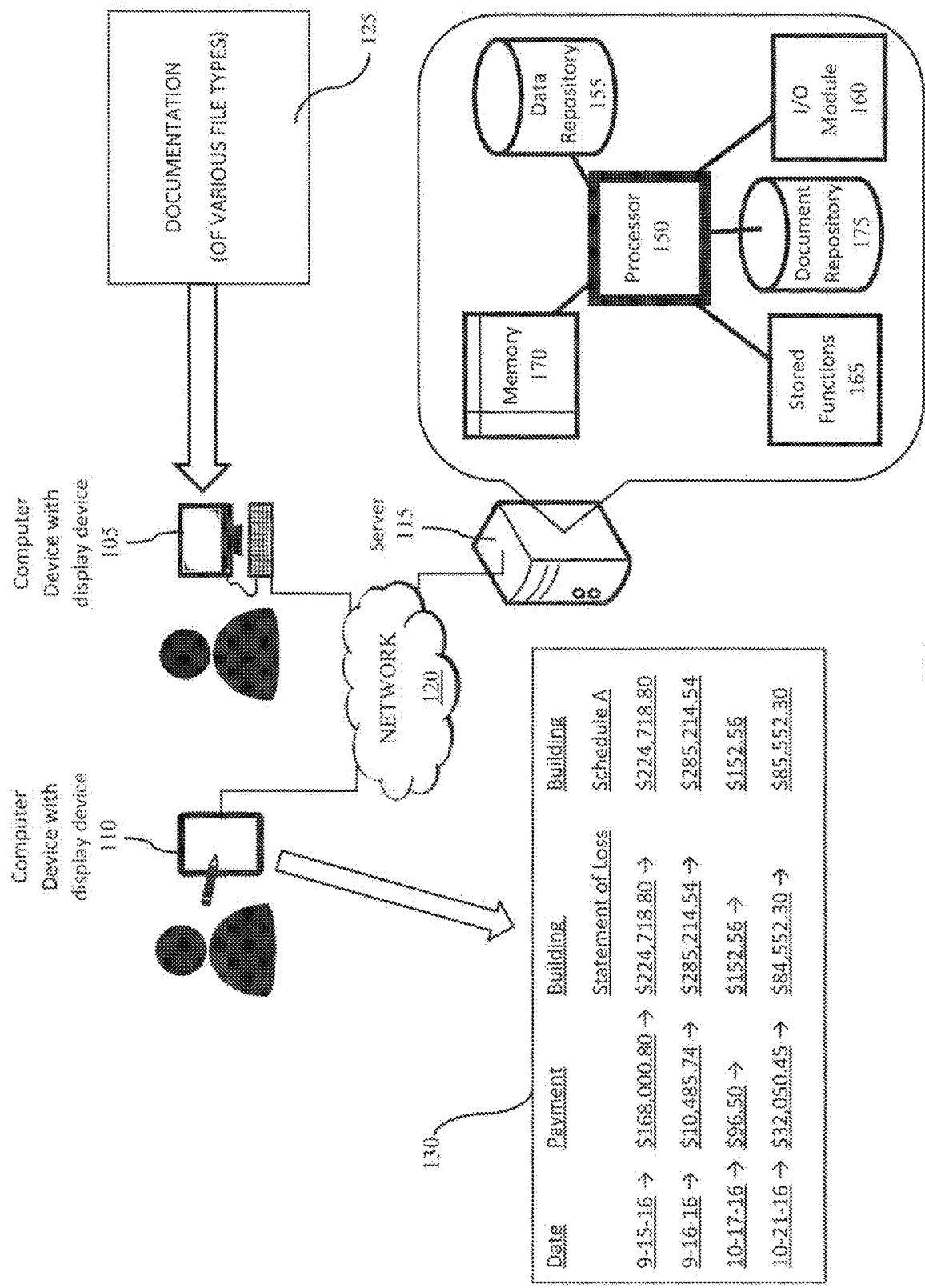
FIG. 1 is a system diagram for collecting, aggregating and reporting insurance claims data according to one embodiment.

Referring now to FIG. 1, a computer-implemented system 100 and related method is shown and described according to one embodiment. In this embodiment, the system 100 requires a first computing device, which can be, for example, a laptop or desktop computer, workstation, tablet, mobile device or other computing device capable of, at minimum, receiving user input data, transmitting data across a computing network according to known protocols, and displaying information on, e.g., a display device such as a computer screen. In this example, the first computing device 105 is used by a property claims adjuster.

The system 100 includes a second computing device 110 which can be the same kind of computing device as the first computing device 105 or different, but is also capable of, at minimum, receiving user input data, transmitting data across a computing network according to known protocols, and displaying information on, e.g., a display device such as a computer screen.

The server 115 can be, e.g., a computer network server in signal communication with the first (105) and second (110) computing systems over a network 120 such as the Internet or an intranet. It should be understood that while FIG. 1 illustrates users using first (105) and second (110) remote computing devices, an alternative embodiment provides that the users can carry out the processes described herein by working directly from or connecting directly to the server 115.

In this embodiment, claim documentation 125 in the form of documents and other data, without limitation, can be input. These data can be digitally stored, e.g., within a digital repository on the server 115. The text in each document of the claim documentation 125 can be converted to searchable data by, for example, utilizing optical character recognition. This provides the ability for the adjuster or policy holder to retrieve documents relating to the claim using, e.g., built-in search functions.

In addition to automatically scanning upon upload with applied optical character recognition for claim-specific database information recall, at least two primary feature segments are coordinated via a financial mathematical digital processing engine (electronic Statement of Loss). The first feature segment includes the consolidation and/or automation of document preparation tasks that are typically performed by the property claims adjuster or related authorized persons, for the purpose of increasing productivity. The second feature segment includes providing clear, convenient and comprehensive instant auditing capability online for policy holders and other authorized persons involved in a property claim for the purpose of enhancing the policy holder's experience.

In this embodiment, server 115 can include, inter alia, a computer processor 150, a memory 170, a data repository 155, an input/output (I/O) module 160 having input and output registers, a repository for storing documents, pictures and other files, hereinafter referred to as a document repository 175 and stored functions 165 which can be, e.g., stored executable functions for carrying out the steps and methods described herein, among other functions. Repository 155 can be, without limitation, a relational database such as a MySQL database or a collection of databases configured to exchange data therebetween as necessary.

In this embodiment, claim documentation 125 can be input by a property claims adjuster into the first computing system 105. The claim documentation 125 can be transmitted to the server 115, wherein, for example, a parsing module contained within the stored functions 165 can parse each document for relevant claim data, such as, for example, coverage terms, invoices, repair estimate values, descriptions of work, names of repair contacts, etc. These data can be stored, e.g., in the data repository 155 and the original documents can be stored, e.g., in the document repository 175.

Processor 150 can perform calculations on the claims data according to predefined, executable stored functions 165 to provide payout information. Payout information can be the amounts of claim payouts payable to a policy holder. In some embodiments, once the payout determinations have been made, those data can be used to automate payment by printing checks, carrying out funds transfers via banks or other financial institutions, transmitting payment data to other integrated automatic systems, or by other methods.

In this embodiment, a policy holder can access payout information and documents, data and other information collected by the claims adjuster. Referring still to FIG. 1, in this example, using the second computing device 110, the policy holder can log on to a user interface provided by the server 115, which can be a website-based portal or other interface. The user may be asked to authenticate themselves or their account using known practices before being able to access account information. Once authenticated, the user can select a payout summary sheet 130 from, e.g., a collection of functions presented on the user interface. In an alternative embodiment, the user can be automatically presented with the payout summary sheet 130 immediately after logging on.

In this example, the exemplary payout summary sheet 130 includes four columns: date, payment, building statement of loss and building schedule A, although it should be noted that the payout summary sheet may include less or more data. For example, the payout summary sheet may include only three columns, "date," "payment," and "coverage" (such as, "building," for example), depending on the desired simplicity of the presentation for a user of the same. Each dollar amount is presented as a clickable hyperlink that, when executed, will bring the user to a first display page. Depending on the extent of granularity of the claim documentation 125, the first display page may itself contain additional hyperlinks that are similarly configured to show the user the origins of those data, including displaying claim documentation 125, for example, as PDF documents; or, in some cases, the hyperlinks may cause a screen to be displayed that shows how certain values were determined.

FIG. 1 illustrates a case where multiple claim payouts have been made, as evidenced by the four rows of data in the payout summary sheet 130. In this example, the payouts were made within a period of just over a month, spanning from 9-15-16 to 10-21-16. Previously, if a policy holder wanted to know for example, what was covered in the 9-15 payment versus (or in addition to) the 9-19 payment, the claims adjuster would usually have to go through a time-consuming and complicated process to determine the origins of those payouts. However, the instant systems and methods allow the policy holder (or claims adjuster) to simply click on any of the dollar amounts shown, which would cause determinative data for those payouts to be displayed.

Figure 2:
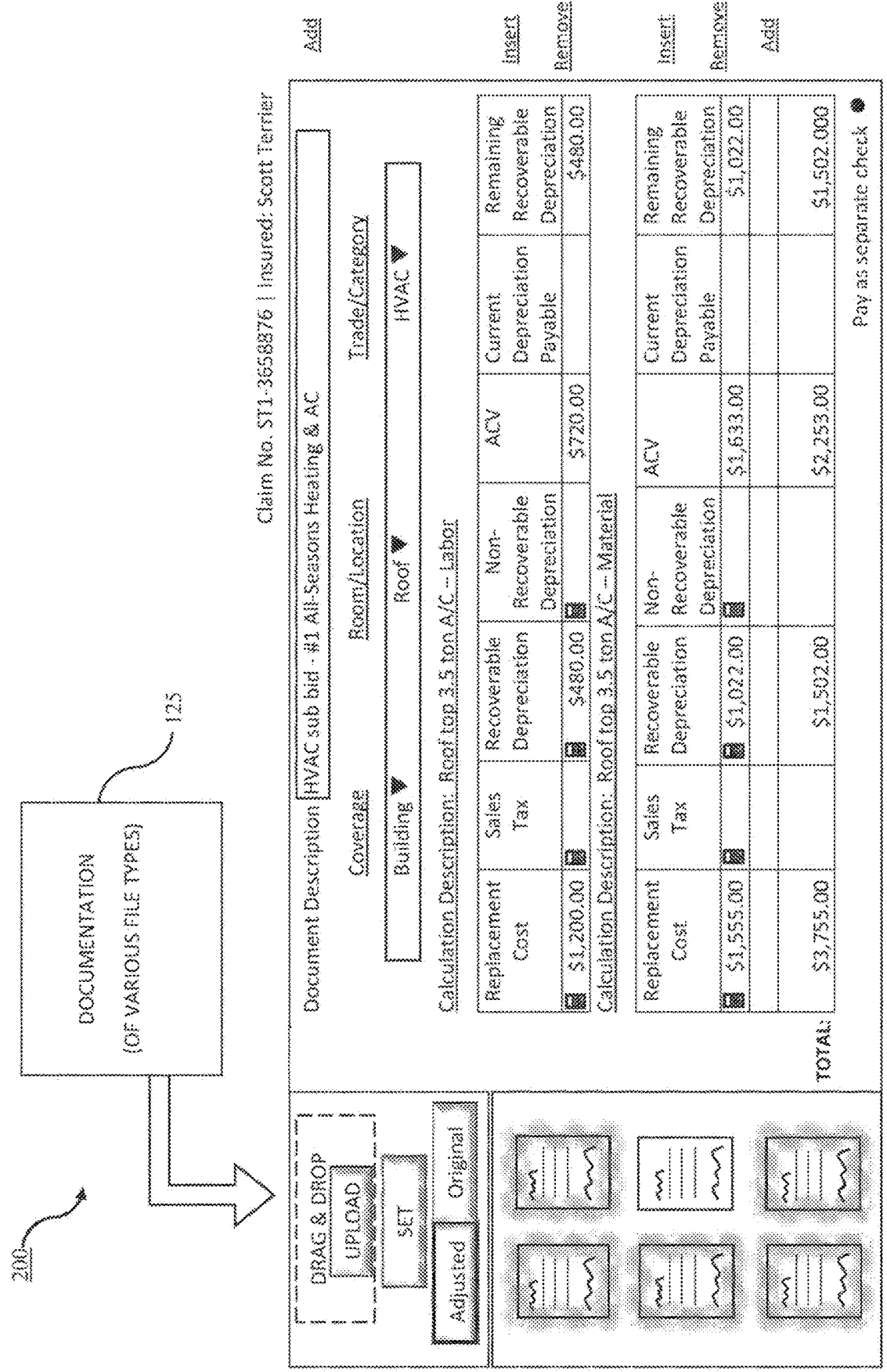
FIG. 2 illustrates a view screen and process for importing claims data into the system.

Referring now to FIG. 2, in this embodiment, claim documentation 125, e.g., documents of any type can be imported, and they can be set as a searchable group of data that can be applied to any claim calculation to form a document description set. Claim calculations can be added to the document description set, and applied to or categorized under any individual coverage within a claim. In the example of FIG. 2, claims data documents have been imported or uploaded, e.g., using a drag and drop method into the "Drag and Drop" dialog box of screen 200. The user can subsequently click "Set" to import the documents and make the data contained therein searchable. In this example, the "replacement cost" field includes a calculator for inputting data on replacing a rooftop air conditioner. Entering a value in the replacement cost field can cause that value to be automatically entered into itemizations, statements of loss, claim reports and other claim documentation.

The re-utilization of data throughout the claims documentation provides transparency for the policy holder, in that he can easily navigate through the related documentation and factors that led to a particular payout determination amount. For example, in this embodiment the policy holder can click on the $10,495.74 payout amount (column 1, row 2 of the payout summary sheet 130); a subsequent, resulting screen snapshot 300 shown in FIG. 3 can show exactly how the claims adjuster arrived at that amount. In this example, the value was derived from the replacement cost value (RCV); depreciation, actual cost value (ACV) and other factors as illustrated, to arrive at the Current Claim Payable information highlighted in red.

In this embodiment, the granularity of data available to the policy holder can be correlated to the claim documentation 125 entered in addition to determinations made by the claims adjuster. Continuing this example, the screen snapshot 300 shows a hyperlink for the RCV value of $285,214.54. The presence of hyperlinked data that the policy holder can follow can be highlighted by underline, different font color and other standard practices. Thus, the policy holder can click on the $285,214.54 hyperlink to cause corresponding data to be displayed as illustrated in exemplary screen snapshot 400 shown in FIG. 4. Any data in the exemplary Building Statement of Loss table can be hyperlinked to related data as illustrated, e.g., in the screen snapshot 1500 of FIG. 15.

In this example, the screen snapshot 400 of FIG. 4 shows the breakdown of costs that, in sum, result in the $285,214.54 RCV value. In this example, such costs include adjuster's estimates, bids, services, supplies and other costs. Each of the costs shown and used in the RCV calculation can be data extracted from claim documentation 125.

Continuing this example, the policy holder may wish to view information relating to any of the listed costs, for example, the parameters of an estimate, building materials selected for rebuilding or repairing a loss, etc. In such a case, the policy holder can click on any of the listed costs, shown here in the left-hand column to cause a screen to be displayed with corresponding information. For example, screen snapshot 500 of FIG. 5 illustrates the result of clicking the "Plumbing sub bid—#1 Above-Water Plumbing" link under the Building column.

Referring now to FIG. 5, this exemplary screen snapshot 500 illustrates how the $6,658.15 ACV dollar amount was determined (the corresponding dollar amount is highlighted in the "Total" field at the bottom of the screen snapshot 500. In this case, the figure results from subtracting the recoverable depreciation from the Replacement Cost that was calculated and entered separately by an adjuster.

Figure 6:
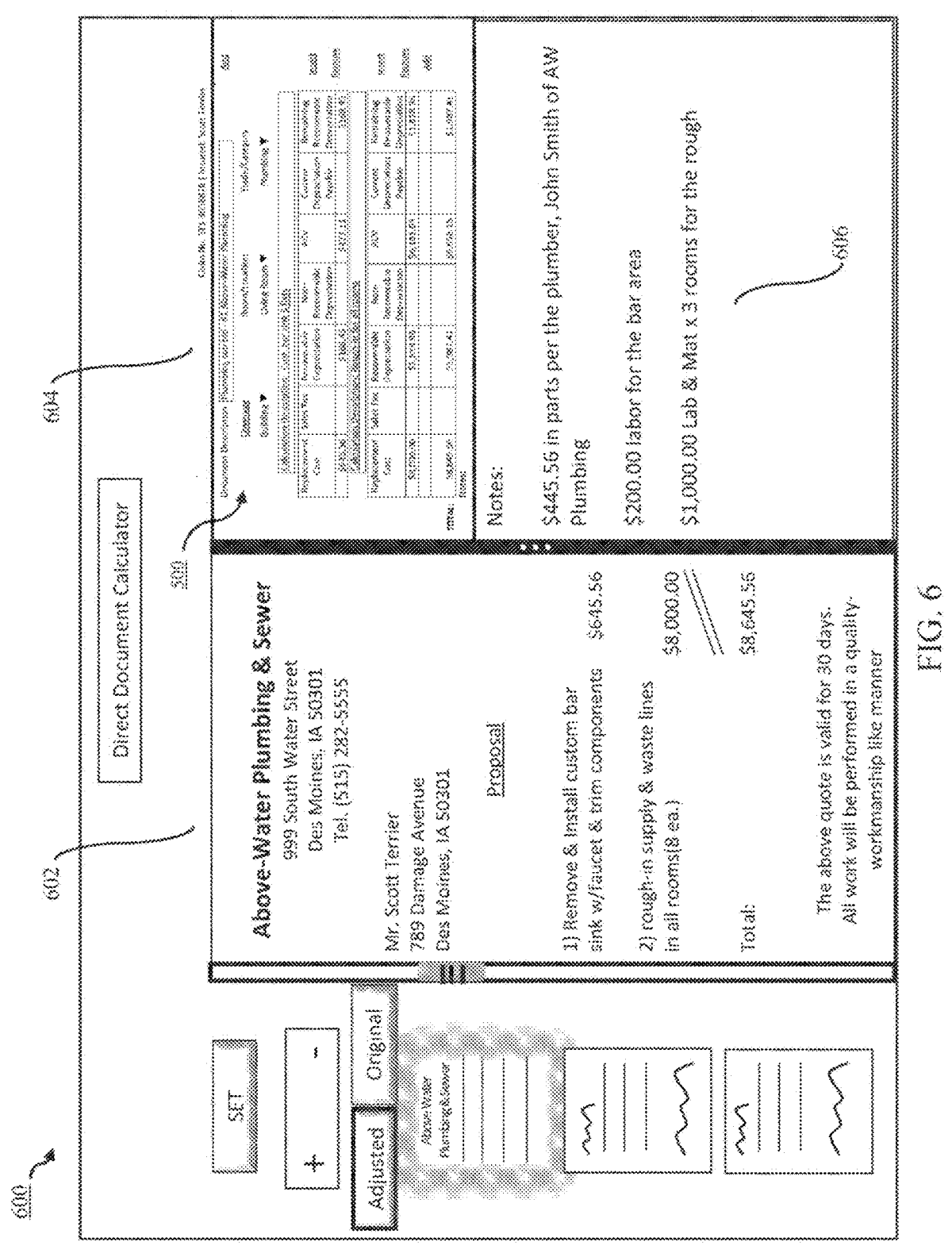

In this and other embodiments, the screen snapshot 500 of FIG. 5 can be shown alone or in tandem with original documents that were part of the claim documentation 125. In this example, the data shown in the screen snapshot 400 of FIG. 4 correlates to a bid proposal provided by a fictitious plumbing company, Above-Water Plumbing & Sewer. In this example, the proposal includes a first bid for removing and installing a custom bar sink with a faucet and trim components for $645.56. This number is reflected in the "Calculation Description: Cust. Bar sink & fixts" section of field or subscreen 602 of the screen snapshot 600 of FIG. 6; similarly, the bid for rough-in supply & waste lines in all rooms (8 ea.) is reflected in the "Calculation Description: Rough-in for all rooms" section of field or subscreen 602 screen snapshot 600. In each exemplary case, the replacement cost takes into account the ACV and the recoverable depreciation; the total cost is then the sum of the two replacement costs. The small calculator icons in the first 4 columns of the "Document Description Set" calculations section 604 ("Direct Document Calculator") can open pop-up menus that provide a variety of property claim-specific calculators. The results from these calculations can flow into the calculation fields and automatically reiterate the calculation results in a narrative form within a text area field 606 below the Direct Document Calculator. An example of the end result of this capability is shown in exemplary screen snapshot 600 of FIG. 6.

This example and the exemplary screen snapshots of FIGS. 2-6 illustrate how the system 100 can provide valuable information to the policy holder. Previously, a policy holder may have simply received a payout check for a given claim amount or portion of a claim along with an itemization and an aggregated statement of loss calculation without any additional navigation capability or automated assistance in matching documentation of damages (invoices, estimates etc.) to specific payments. However, the system 100 described herein allows the policy holder or claims adjuster to quickly and easily drill down into the specifics of a payout, enabling him to answer questions such as "what was the payout for?" "what items were included in the payout?" "how were the payout amounts determined?" etc. Accordingly, significant time and effort can be saved when these questions arise because all information relating to a claim is stored in the system and linked in easily navigable ways to allow a person to drill down to a desired level of information granularity. System 100 also provides technology to the policy holder enabling him to eliminate the inconvenience and frustration of correlating volumes of documentation of damages to numerous payments, following complicated insurance policy-directed subtractions. System 100 substantially clarifies and simplifies this entire process.

In addition, because claims data is stored in a desired, manipulatable and re-usable form, the documentation process is greatly simplified. Claims adjusters can import claims data into premade templates, for example, simplifying the documenting and reporting process.

Figure 7:
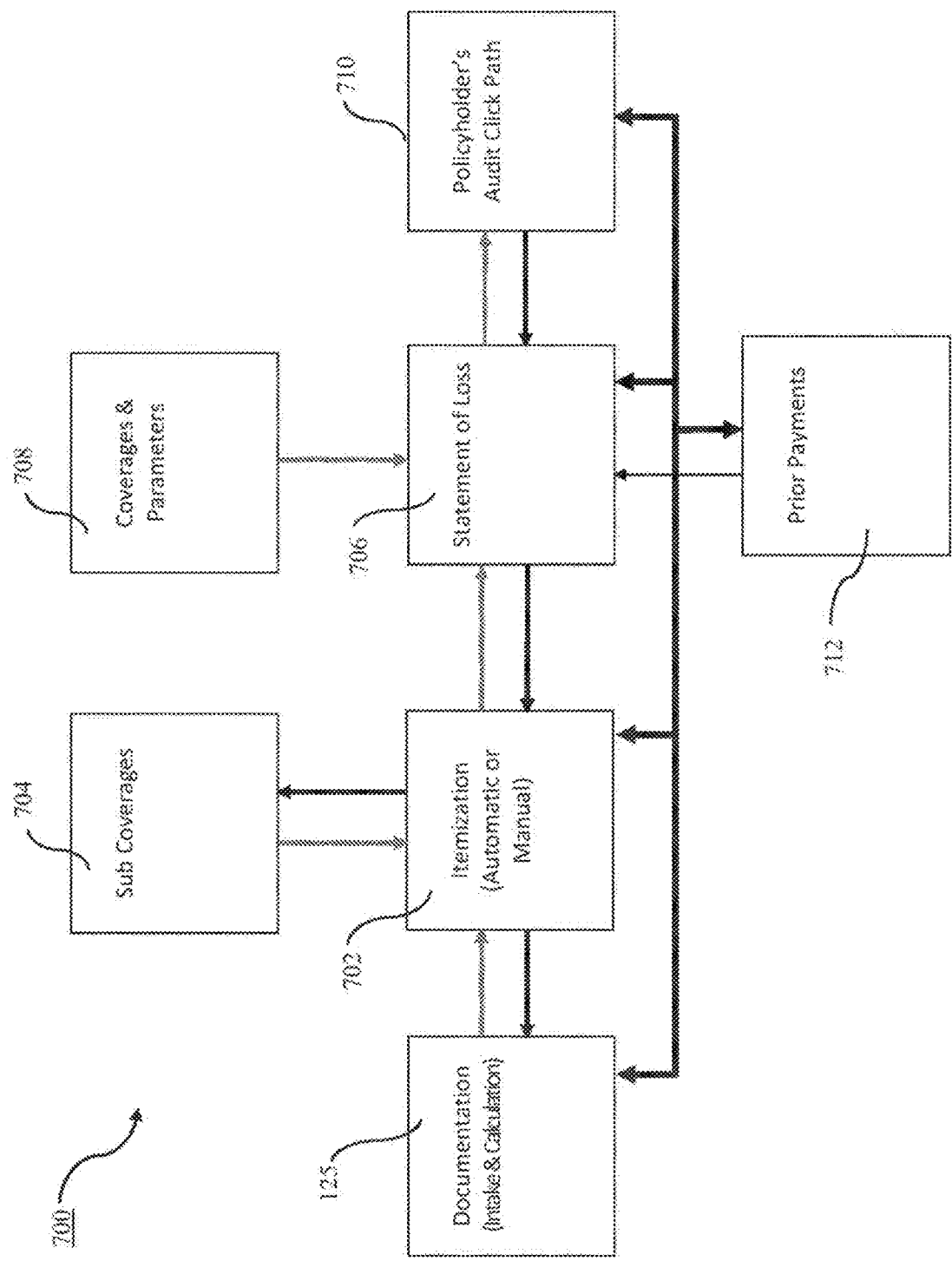
FIG. 7 illustrates data flow between claim loss components according to one embodiment.

Referring now to FIG. 7, data flow 700 illustrates how the system 100 accepts and provides information from and to the claims adjuster and policy holder, respectively. In this example, the Documentation block can include, for example, inputting claim documentation 125. These data are used to populate Itemization documents 702, taking into account Sub Coverage data 704. Statements of Loss data 706 follow, which take in data 708 from policy Coverages and Parameters and Prior Payments which can result in the production of a Policy holder's Audit 710.

From the policy holder's perspective (or a claims adjuster), these data can be accessed anywhere along the line as illustrated by the black line. For example, policy holders can investigate the origins of any prior payments 712, leading to the Statement of Loss information 706; from there, depending on what information the policy holder is after, he can be shown data pertaining to his policy coverage, itemization of bills, invoices, estimates, etc., or any other data. The data flow 700 illustrates in a general aspect how the systems and methods described herein provide traceable data routes ("click paths") for both policy holders and claims adjusters.

Referring now to FIGS. 8-16, successive view screens are shown for the purpose of illustrating how claims data can be input according to one non-limiting embodiment. The view screens shown can be, for example, in the form of a website or a stand-alone software platform, without limitation. Additionally, while not every feature is discussed, certain available functions will be recognizable by their description in the various views.

Figure 8:
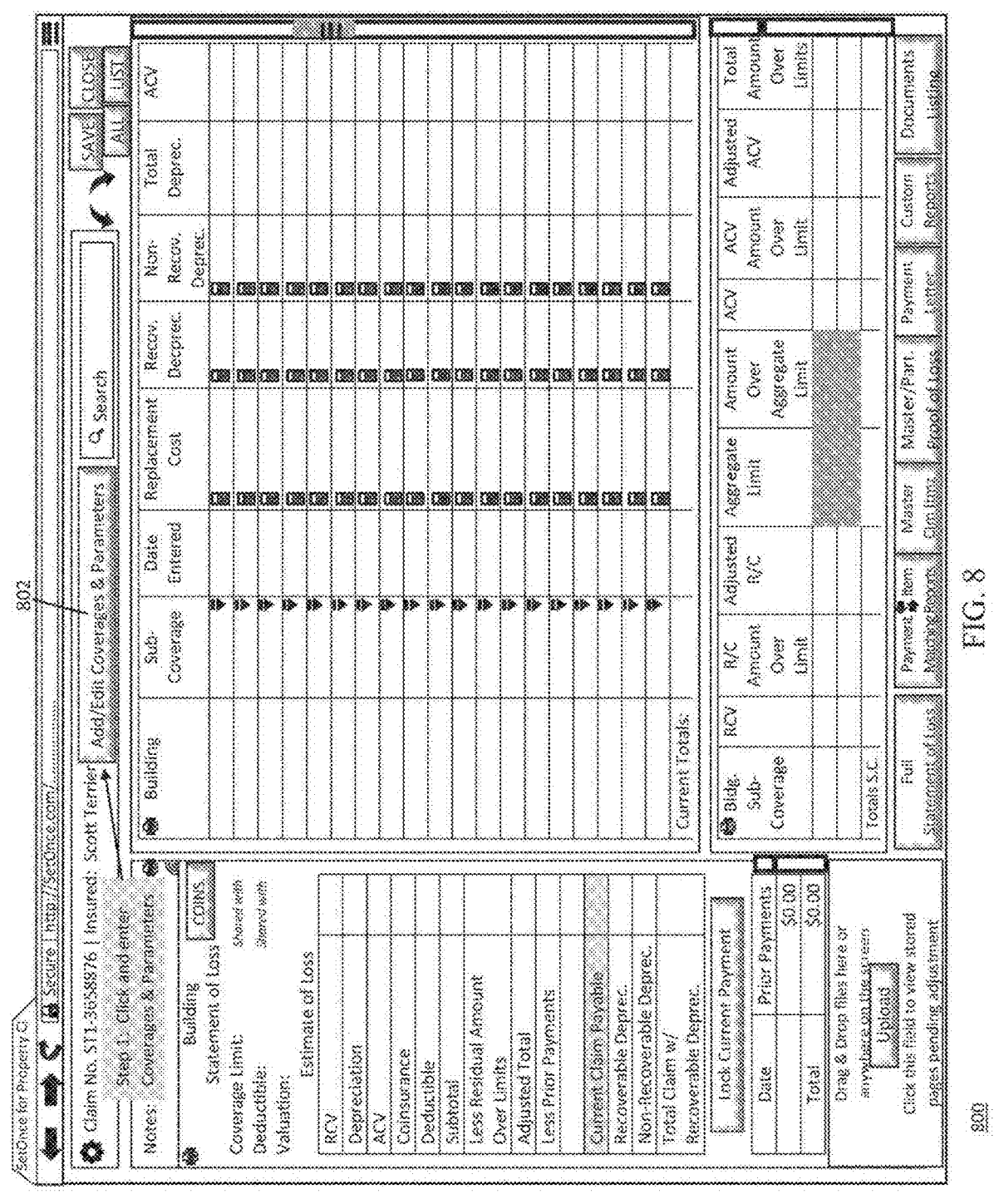

Referring first to FIG. 8, in this embodiment, a user can click the highlighted "Add/Edit Coverage & Parameters" button 802 to begin the process of importing policy and claims data. Clicking the highlighted button creates a popup modal window shown in the view screen 900 of FIG. 9.

Figure 9:
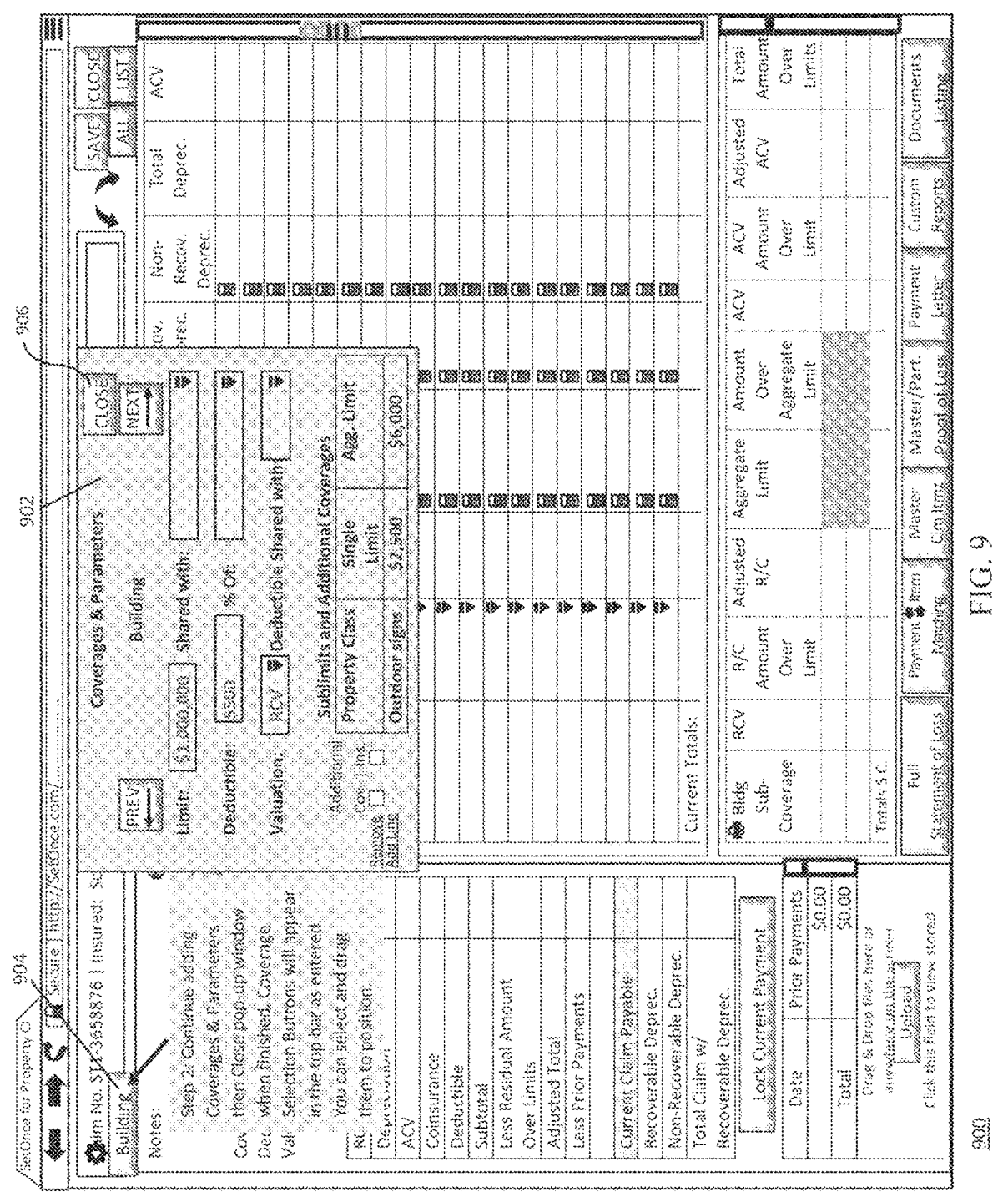

FIG. 9 illustrates popup modal window 902 and shows that the user is inputting coverage data relating to an exemplary Building; however, the coverage can be to any subject or item and the present invention should not be limited as described herein. The coverage limit, deductible, valuation and other data can be entered in the popup window 902 which, in this embodiment, creates a new window tab 904 named "Building" and contains the information as entered in the popup window 902. Additional coverages and parameters can be added as desired, and additional tabs may be added adjacent window tab 904 for the additional coverages and parameters for other subjects and/or items. Then, the user can click the "Close" button 906 to discontinue adding such data.

Figure 10:
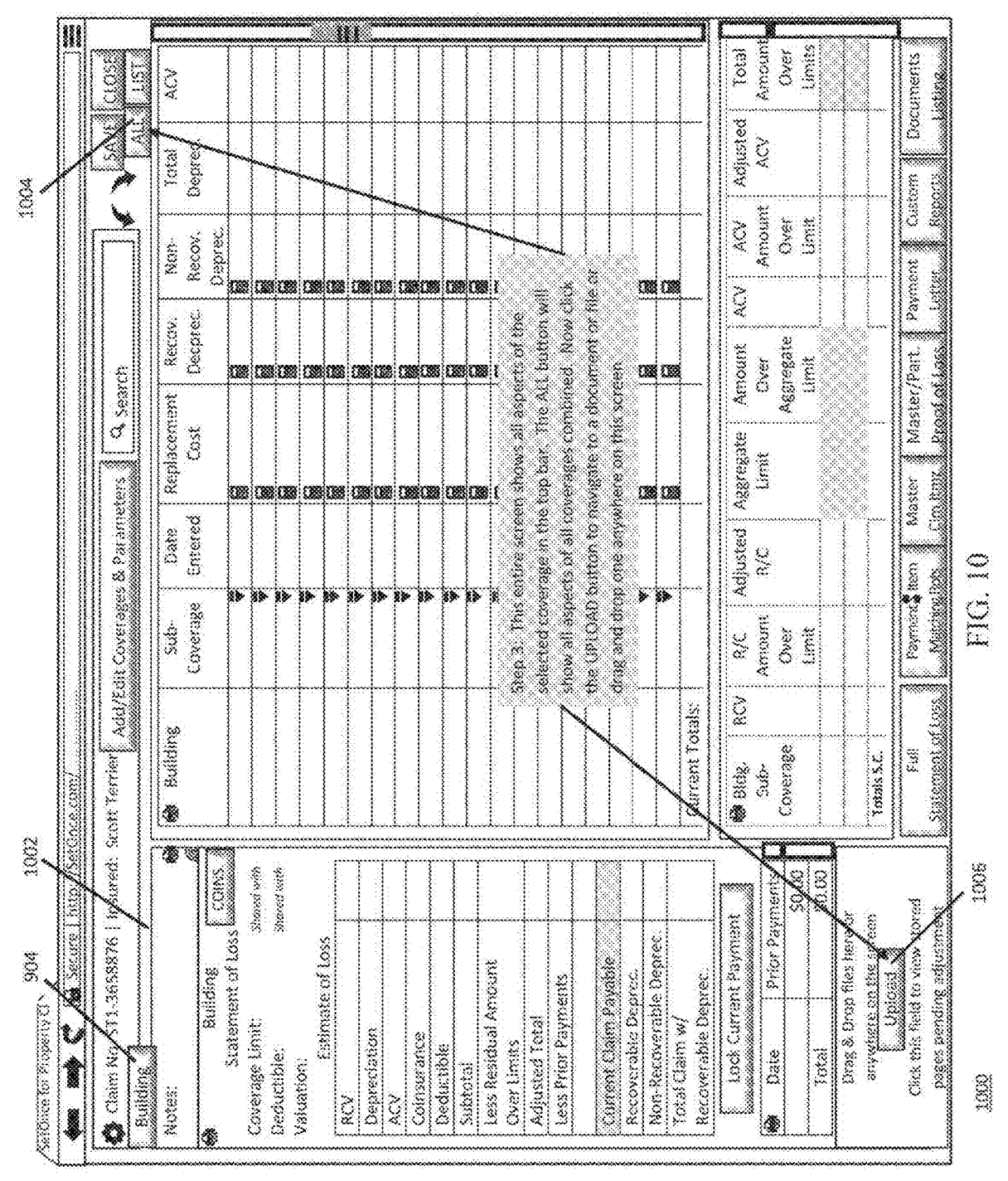

The view screen 1000 in FIG. 10 illustrates all aspects of the selected coverages in the top bar 1002 (e.g., in this example, the "Building" coverage). A plurality of subjects or items may be entered relating to a particular coverage; each subject or item may appear in the top bar 1002, such as, as previously described, adjacent tab 904. Clicking the "All" button 1004 at the top right can show all aspects of all coverages combined. The "Upload" button 1006 can be used to navigate to a document or file; or to drag and drop a document anywhere on the screen, which can cause data on such a document to be imported. Data importation can be accomplished automatically or by manual data input.

Figure 11:
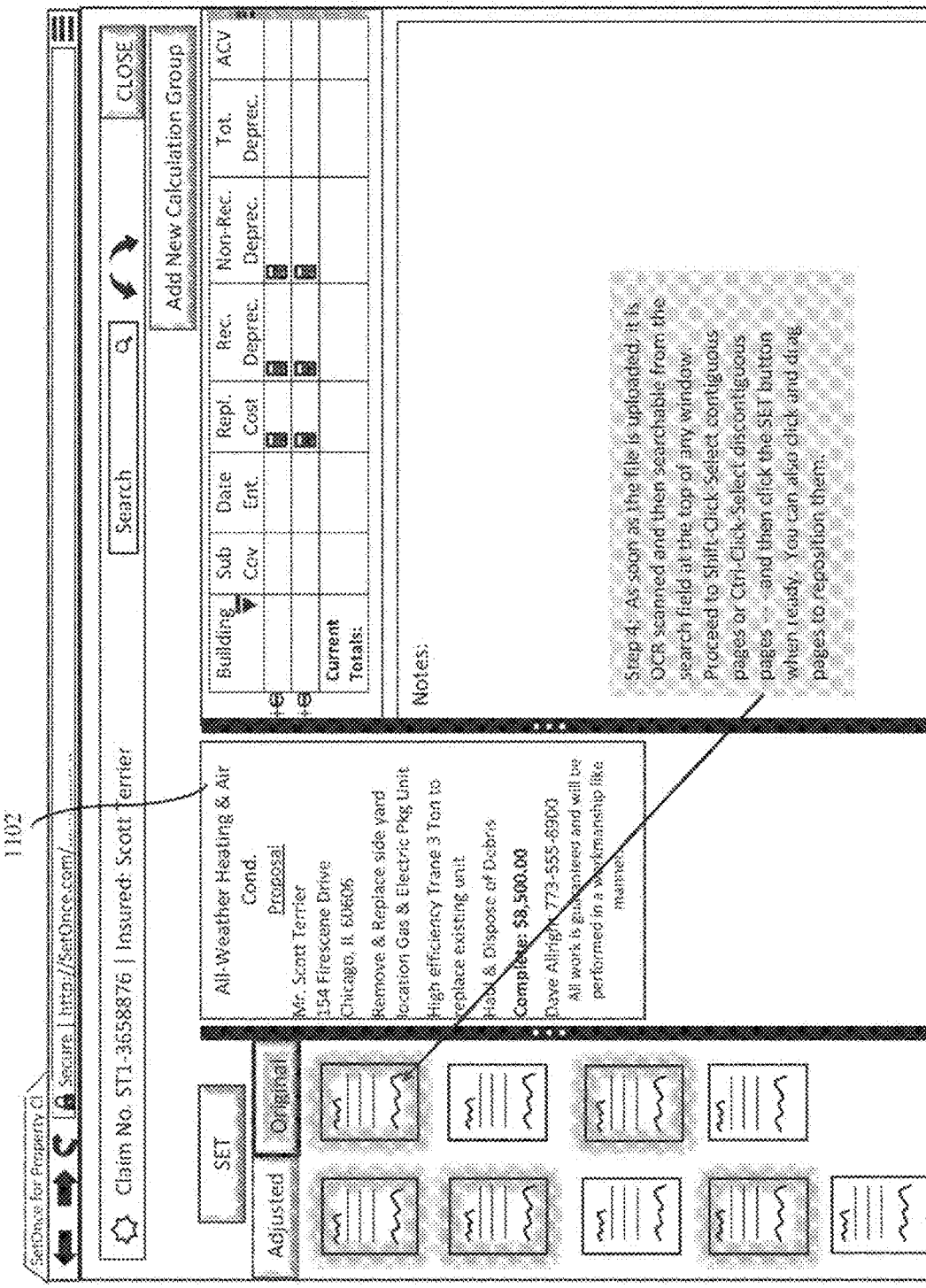
FIG. 11 illustrates an exemplary screen snapshot of an interface for uploading claim documents into the system.

For example, referring now to FIG. 11, in this view screen 1100 a document 1102 has been uploaded as a file to, e.g., the server 115 of the system 100. Once the file has been uploaded, it can be scanned, e.g., using optical character recognition and transformed into a searchable document that can be digitally stored on the system, e.g., in document repository 155 of system 100. Pages 1104 of the uploaded document 1102 are illustrated on the left portion of view screen 1100. In practice, a user can select one or multiple of the pages 1104 to be scanned for data and have those data extracted and inserted into pertinent data fields. Alternatively, the data may be extracted manually and entered by a claims adjuster. Indeed, manual extraction and entry of data by a claims adjuster may be preferred, as this may decrease the potential for errors in data entry.

Figure 12:
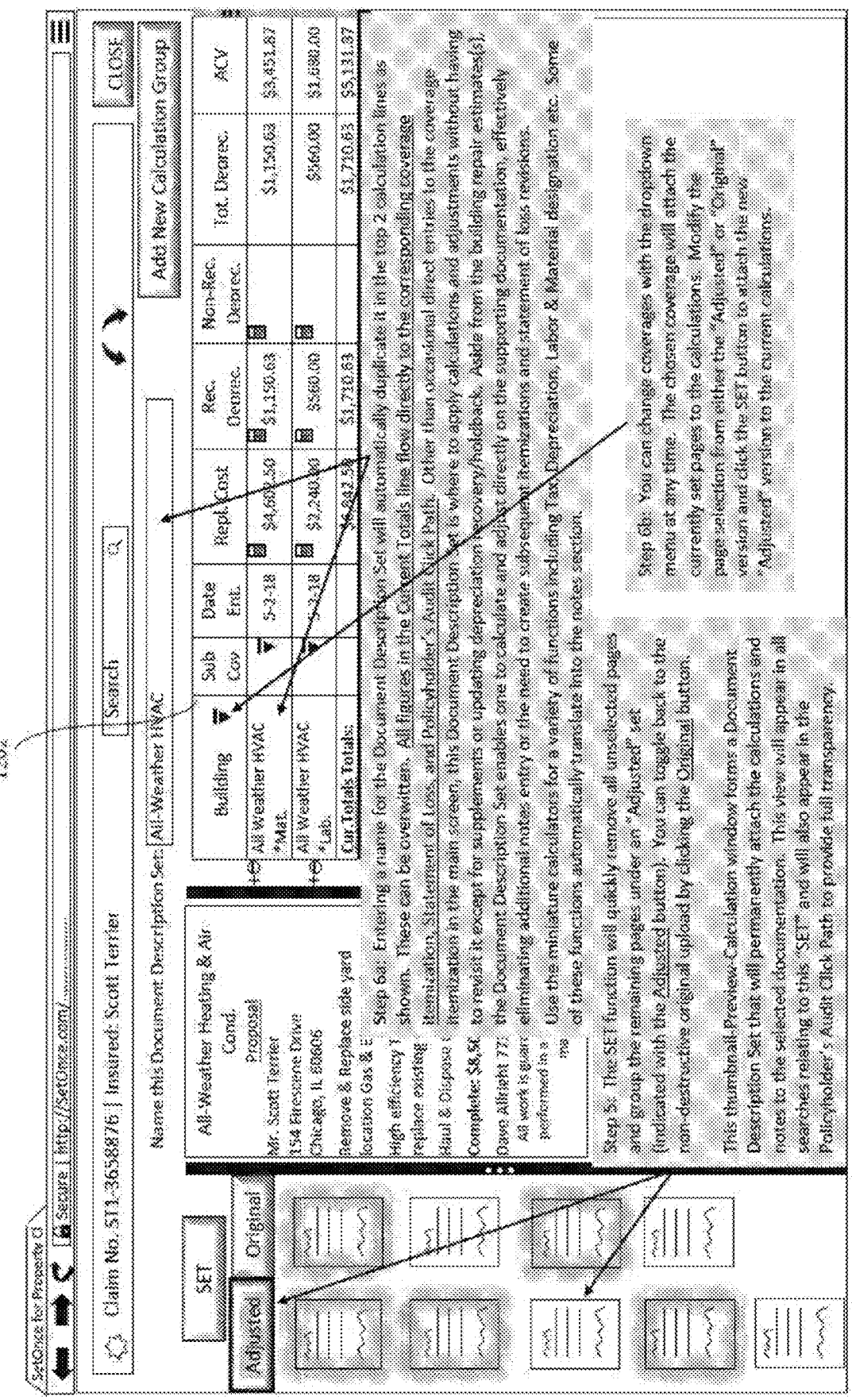
FIG. 12 illustrates parameters of a Document Description Set input interface according to one embodiment.

For example, referring to FIG. 12, which shows a Document Description Set Window view screen 1200, in this example, data pertaining to the Building loss has been extracted from the selected pages of the uploaded documents 1102, from FIG. 11. As noted above, preferably, the data pertaining to the Building loss is manually entered into the system herein to ensure that errors in data entry are not made. However, it should be noted that this data may be extracted automatically, as long as mistakes in data entry are minimized or, more preferably, eliminated. The extracted data can be seen in the table 1202 within the upper portion of the view screen 1200, showing, in this example, a material cost of $4602.50 and labor costs of $2240.00. These data are immediately ordered and organized during the re-ordering and separating of uploaded document pages upon which the claims adjuster can quickly apply calculations in the attached "Direct Document Calculator" while working in the context of just the documentation in the view screen. All figures in the Current Total line (e.g., Replacement Cost of $6842.50) flow directly to the corresponding coverage itemization, statement of loss, and policy holder's audit click path as described previously. The Document Description Set window 1200 allows a user to calculate and adjust directly on the supporting documentation, effectively eliminating additional notes entry or the need to create subsequent itemizations and revisions to the statement of loss.

Figure 13:
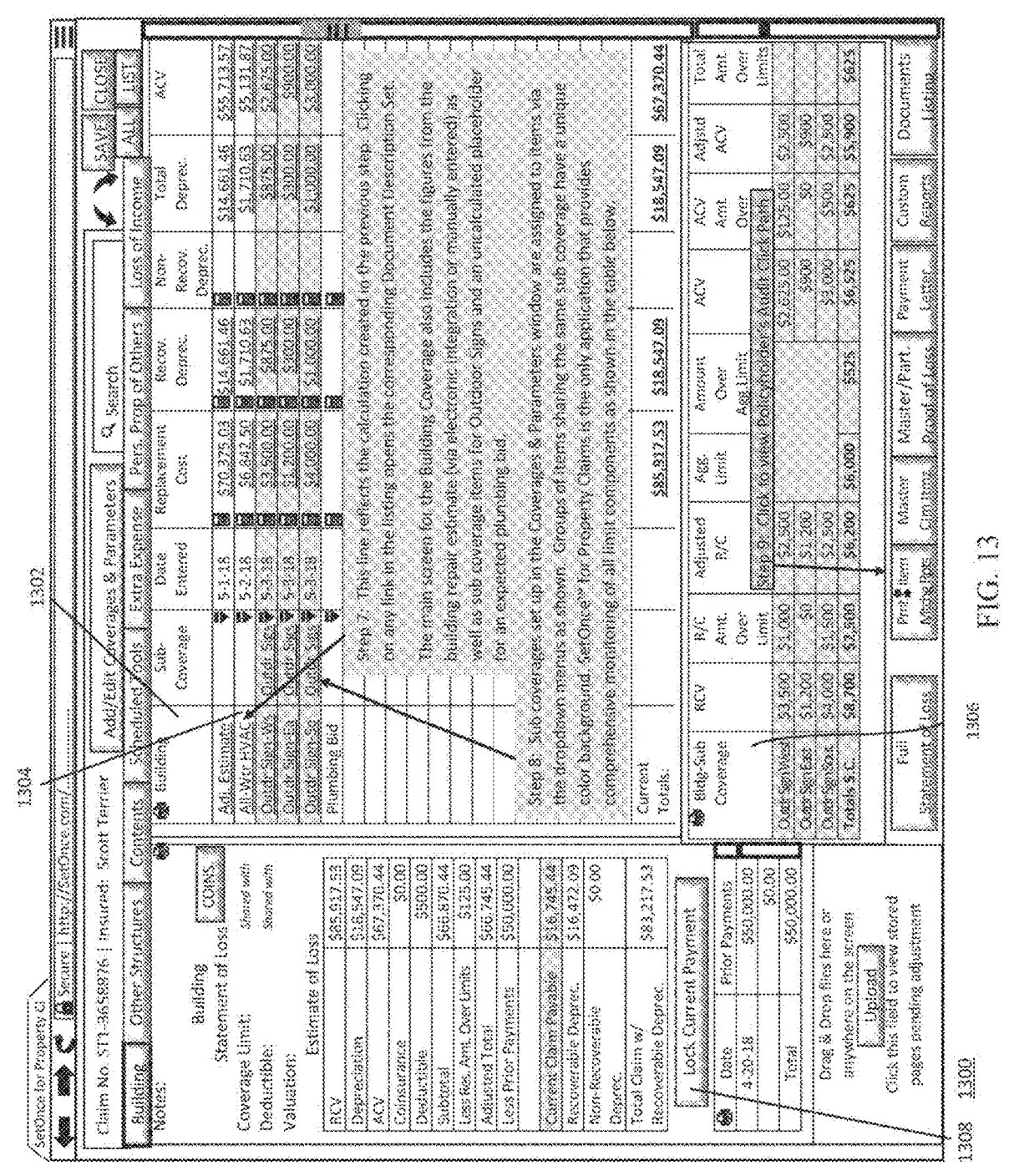

Referring now to FIG. 13, the view screen 1300 illustrates the calculations and data entry as described with respect to FIGS. 11 and 12. In this example, the Document Description Set was entitled "All-Weather HVAC" as illustrated in FIG. 12; the second line item from the top for this portion of the overall claim, shown in table 1302, is illustrated in view screen 1300. Here, clicking on the "All-Weather HVAC" item hyperlink in table 1302, or, in an alternate embodiment, any item that is presented as a hyperlink within the "All-Weather HVAC" row 1304 will open the corresponding Document Description Set, e.g., as illustrated in view screens 1100 and 1200. Additional Document Description Sets can be added as necessary for the claim; in this example, six Document Description Sets have been added in table 1302 or in the case of the "Outdoor Signs" sub coverage, 3 separate lines on the main coverage screen for the building are linked to one Document Description Set that has 3 calculation groups. Any line within a Document Description Set calculation group that is designated via drop down selector to a sub coverage, can have its calculation group Total appear on a separate line of the main screen for its corresponding coverage.

In this embodiment, the lower portion of view screen 1300 includes a "Sub Coverages" table 1306. The sub-coverages shown in the Sub Coverages table 1306 in this example relate to the "Outdoor Sign—West (per bid)", "Outdoor Sign—East (per bid)" and "Outdoor Sign—South (per bid)" highlighted lines under the Building coverage window. In this embodiment, sub coverage can be set up in the Coverages & Parameters window and can be assigned to items via dropdown menus as illustrated. In one example, groups of items sharing the same sub coverage can have a uniquely-colored background. This provides comprehensive monitoring of all limit components as shown in the table. Specifically, comprehensive sub-coverage monitoring of the status of limits of sub coverages may provide the claim representative with the entire basis for the resultant values at any given point as the claim develops.

Figure 14:
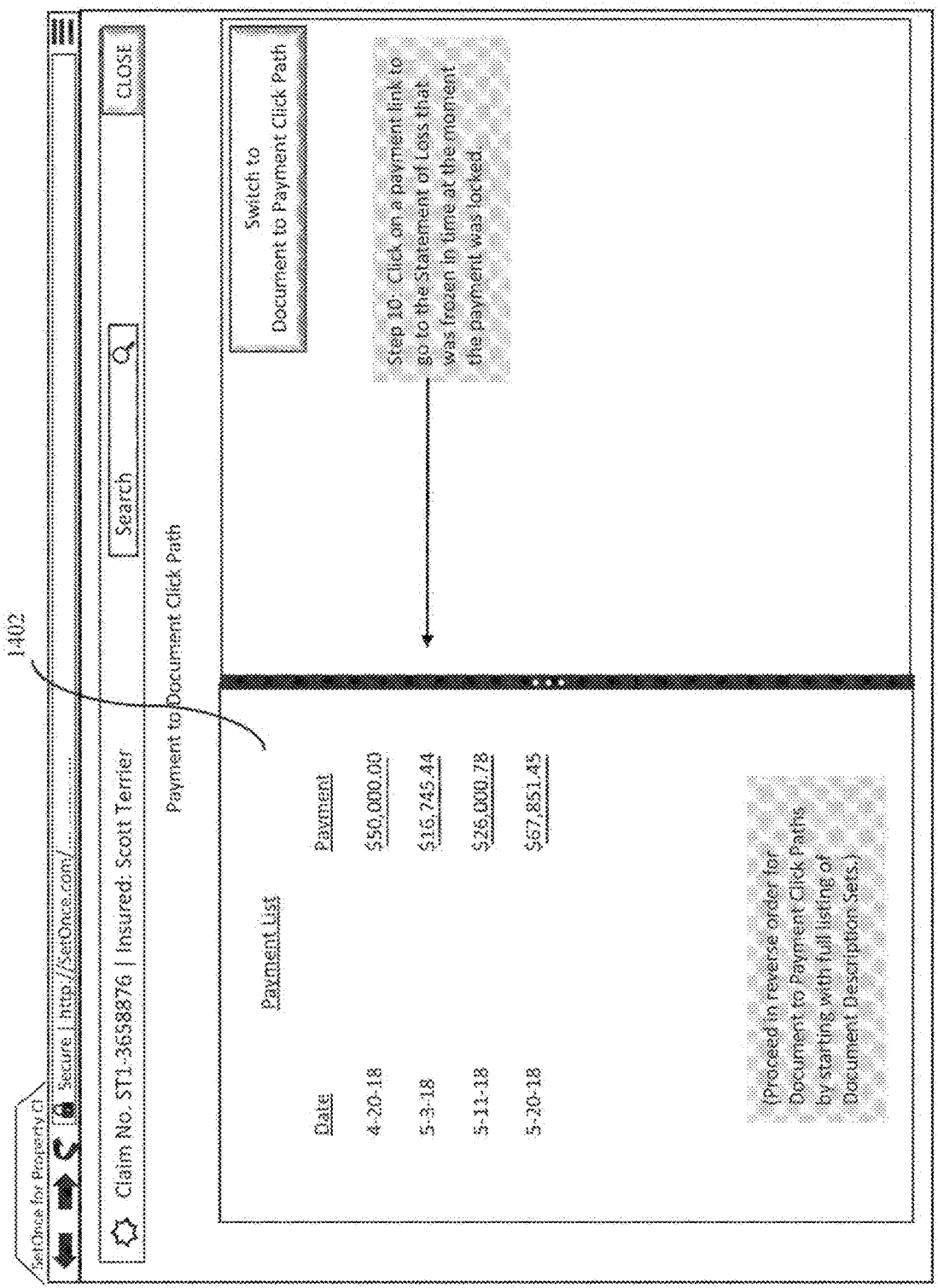
FIG. 14 illustrates an exemplary screen snapshot of a payout list, including hyperlinks for viewing the origins of each payout, according to one embodiment.

Referring now to FIG. 14, the beginning of a "Payment to Document" click path is illustrated in view screen 1400 according to one embodiment. Like the payout summary sheet 130, illustrated in FIG. 1, the date and payment amount data shown under the Payment List 1402 are hyperlinks that ultimately lead to the Document Description Set viewscreens via the corresponding Statement(s) of Loss and Itemization(s) completed for each payment amount. In this embodiment, the Statement of Loss corresponding to any particular payout can be frozen or locked after the payout is made by pressing the "Lock Current Payment" button 1308, as illustrated in FIG. 13, to alleviate confusion that may arise from amending the statement of loss after payment has been made. Specifically, locking or "freezing" the data by pressing the "Lock Current Payment" button 1308 when a payment is made allows the system to preserve payment scenarios for convenience access and reconciliation at a later time. Thus, when a payment is made, all documents, data, calculations, reports, and other like elements of the present invention, may be preserved as of the date the payment was made. Thus, when changes are made to a claim at a later time, it is possible to go back to when an earlier payment was made and re-construct how the payment was calculated.

Figure 15:
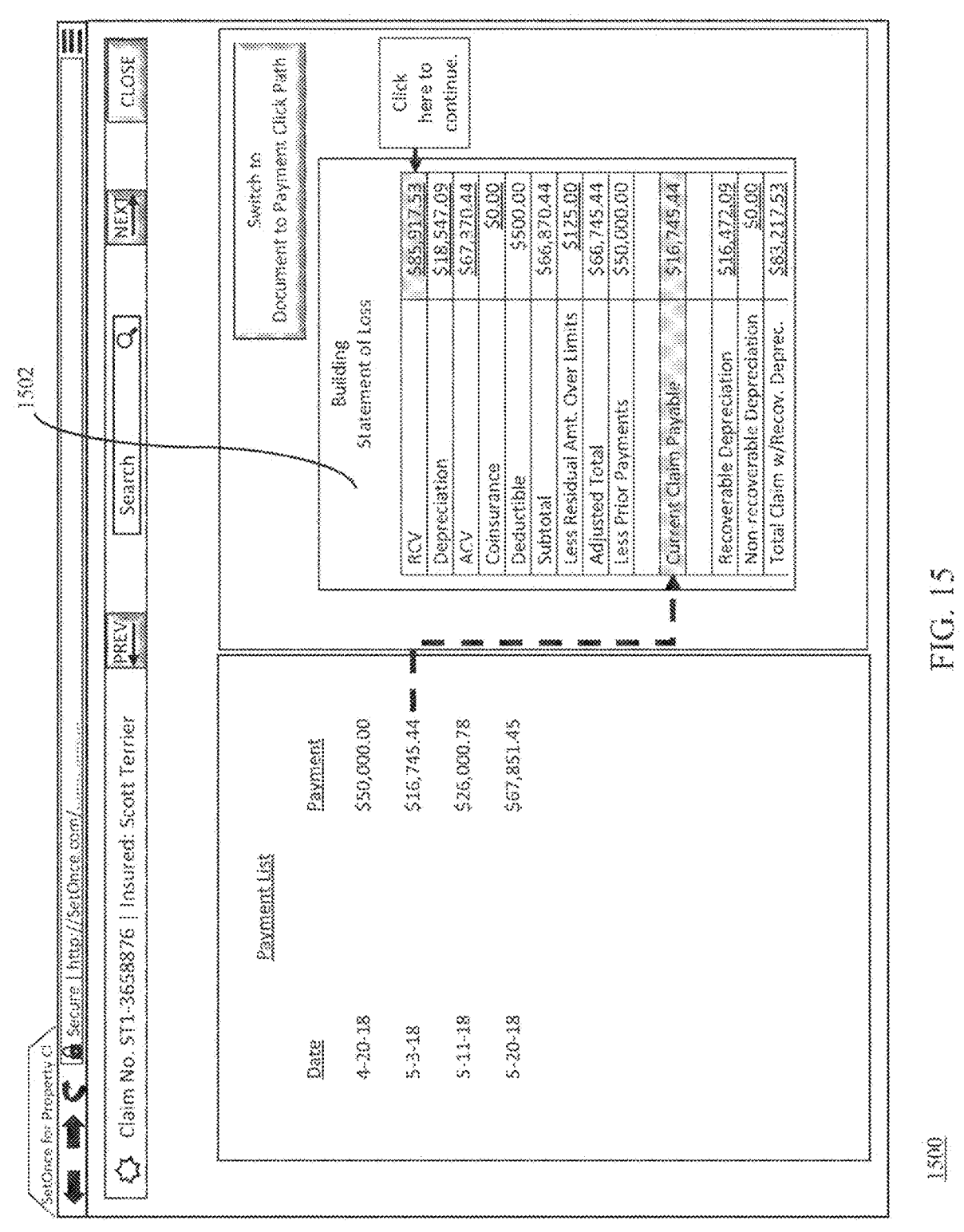

Continuing this example and referring to FIG. 15, showing viewscreen 1500, the user has decided to click the $16,745.44 payout from 5-3-18. In this embodiment, such action can cause a popup 1502 window to be displayed, in this example, titled "Building Statement of Loss," as the payout pertains to the building loss. As illustrated in the viewscreen 1500, the popup window includes a table of all of the parameters that were considered in the calculation of the Current Claim Payable amount of $16,745.44.

Figure 16:
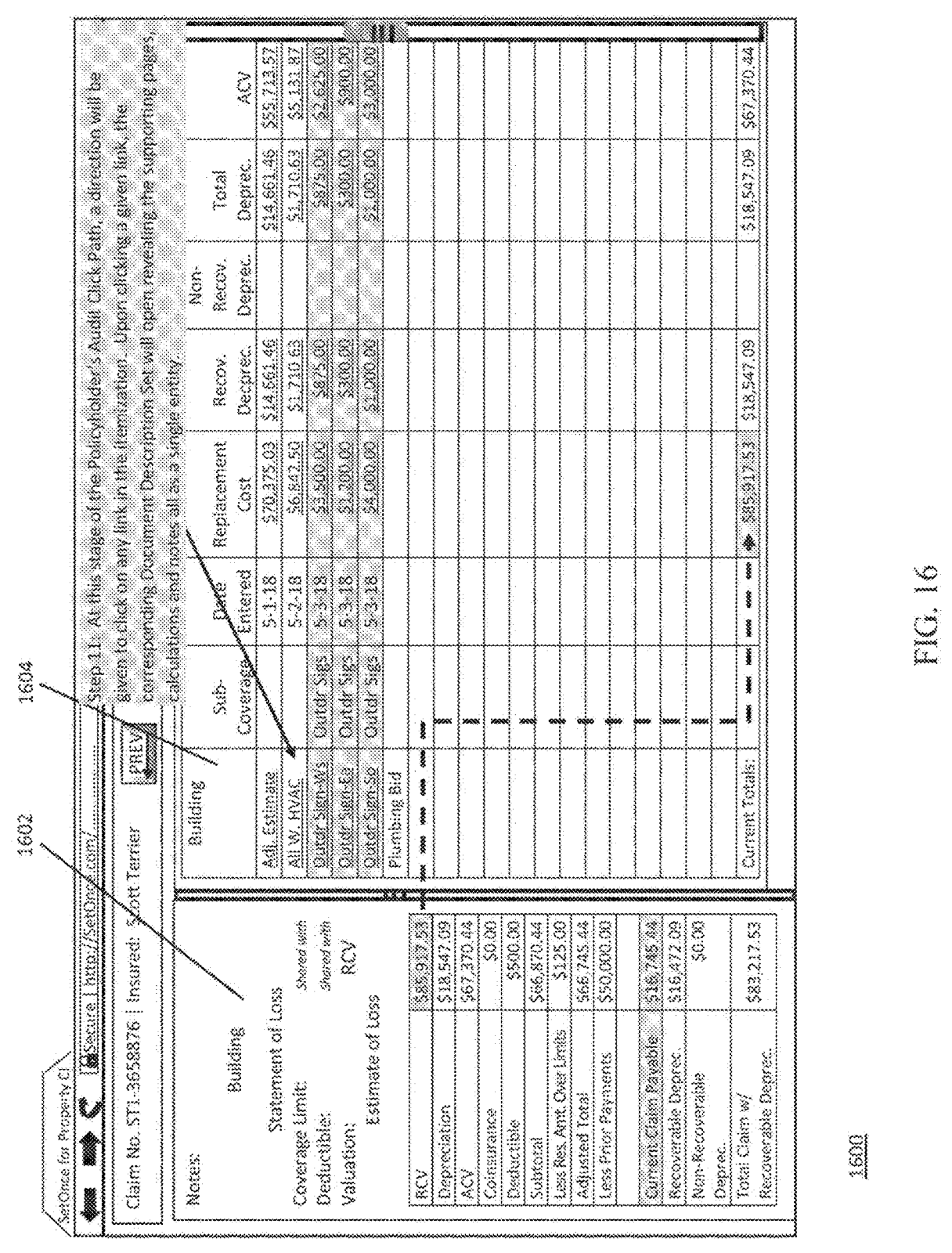

If the user desires further information about the payout, he can click, for example, the RCV value, leading him to the view screen 1600 shown in FIG. 16. As shown in this view screen 1600, the same pop-up window shown in view screen 1500 is present on the left-hand portion 1602 of the screen 1600. The table 1604 in the main portion of the view screen 1600, however, shows the source values for the determination of the RCV, as this was the value the user desired information about. Clicking any link in the itemized list can bring the user to the corresponding Document Description Set, revealing supporting documentation, calculations and notes as a single entity.

Figure 17:
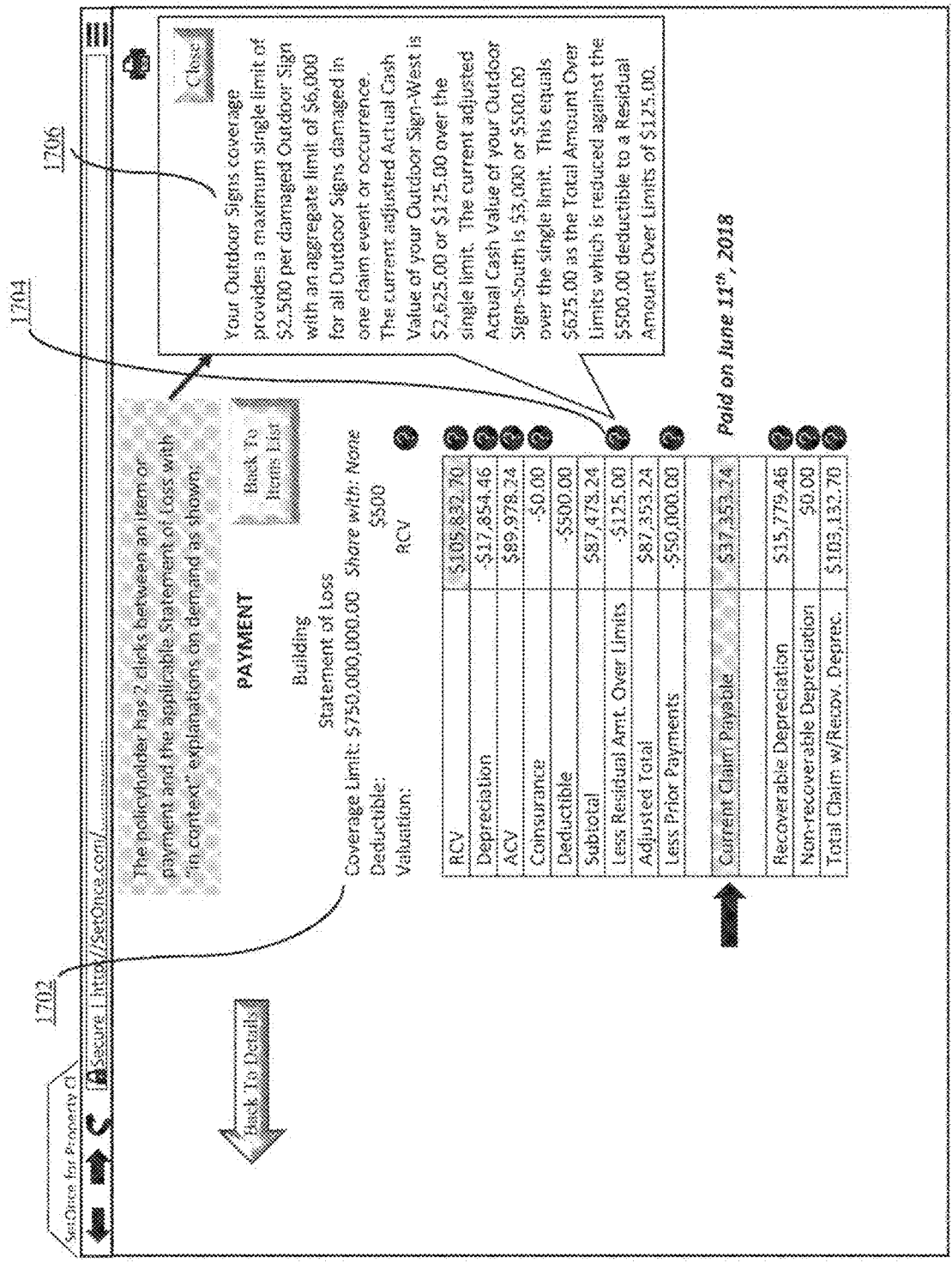
FIG. 17 illustrates an exemplary screen snapshot of a statement of loss for a claim payout, according to one embodiment.

As illustrated in FIG. 17, view screen 1700 shows a representation of a Statement of Loss in field 1702, showing a payment and an itemization of statement of loss calculations leading to the payable amount. Icons 1704 may be associated with specific line items in the Statement of Loss, represented in FIG. 17 as question mark icons, which may provide a pop-up box 1706 displayable on view screen 1700 containing explanation text concerning the particular line item in the Statement of Loss. This may be particularly useful for a policy holder to obtain particular information concerning the Statement of Loss, such as definitional information, policy limitations, or other like information, so that a user thereof can quickly and easily obtain the information concerning the line item.

The system of the present invention may include communication portals or mechanisms through which a policyholder and claims adjuster or agent may communicate together as either or both review the various viewscreens presented herein. Specifically, in one embodiment, an interactive overlay may be added to any viewscreen of the present invention allowing the policyholder or the claims adjuster or agent to add a note addressed to the other. Therefore, questions or other information may be added to the various viewscreens within the interactive overlays addressed to another. Thus, further information may be presented or requested. The recipient of such an overlay message may be able to respond to such a message by adding his or her further information, such as an answer to an inquiry, a confirmation, or other like information. The overlay may remain with the particular viewscreen it is associated with until one or the other party removes it from the viewscreen. Of course, any other means for providing communication between parties viewing the viewscreens of the system of the present invention may be included, and the present invention should not be limited as described herein.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

A number of illustrative embodiments have been described. Nevertheless, it will be understood that various modifications may be made without departing from the spirit and scope of the various embodiments presented herein. For example, the systems and methods described herein can be deployed as a stand-alone system or integrated with existing estimating and claims management systems. Accordingly, other embodiments are within the scope of the following claims.

What is claimed is:

1. A method of visually presenting property insurance claim decisions input into a server by a claims adjuster for audit by a policy holder of a property insurance policy, comprising the steps of:
   (a) transmitting payment list data of the property insurance claim over an internet from a relational database by a processor on a server belonging to an insurer to a computer device belonging to the policy holder;
   (b) displaying a payment list illustrating a plurality of property insurance claim payments in a first view on a display screen of the computer device belonging to the policy holder using the payment list data transmitted in said step (a);
   (c) displaying hyperlinks associated with each payment on the payment list in the first view on the display screen of the computer device belonging to the policy holder;
   (d) transmitting itemized statement of loss data over the internet from the relational database by the processor on the server belonging to the insurer to the computer device belonging to the policy holder, the itemized statement of loss data including replacement cost value data and subtraction data therefrom applicable to the property insurance policy;
   (e) displaying an itemized statement of loss illustrating the replacement cost value and subtractions therefrom in a second view on the display screen of the computer device belonging to the policy holder using the itemized statement of loss data including the replacement cost value data and the subtraction data therefrom transmitted in said step (d) corresponding to a selected one of the hyperlinks associated with a selected one of the payments selected in the first view by the policy holder on the computer device belonging to the policy holder;
   (f) transmitting itemization of coverage data over the internet from the relational database by the processor on the server belonging to the insurer to the computer device belonging to the policy holder, the itemization of coverage data including property items data and associated damages data applicable to the property insurance policy; and
   (g) displaying an itemization of coverage illustrating a list of property items with associated damages corresponding to each of the property items in a third view on the display screen of the computer device belonging to the policy holder using the itemization of coverage data including the property items data and the associated damages data transmitted in said step (f), wherein only a subset of the property items with associated damages are listed in the third view that correspond to the payment chosen by the selected one of the hyperlinks associated with the selected one of the payments displayed in the first view by the policy holder on the computer device belonging to the policy holder.

2. A method of visually presenting property insurance claim decisions according to claim 1, wherein the method further comprises the step of (h) displaying a hyperlink associated with the itemized statement of loss in the second view on the display screen of the computer device belonging to the policy holder; and
wherein said step (g) of displaying the itemization of coverage further comprises the step of (g)(1) displaying the itemization of coverage illustrating property items with associated damages data in the third view on the display screen of the computer device belonging to the policy holder using the itemization of coverage data including the property items data and the associated damages data further corresponding to the hyperlink associated with the itemized statement of loss selected in the second view by the policy holder on the computer device belonging to the policy holder.

3. A method of visually presenting property insurance claim decisions according to claim 2, wherein the damages data displayed in said step (g) in the third view on the display screen of the computer device belonging to the policy holder include representations of replacement cost and depreciation.

4. A method of visually presenting property insurance claim decisions according to claim 1, wherein the server belonging to the insurer transmits in said step (a) only a locked value for each of the payments in the payment list data and wherein the server transmits in said step (d) only a locked value for each entry in the itemized statement of loss data including the replacement cost value data and the subtraction data therefrom and wherein the server transmits in said step (f) only a locked value for each entry in the itemization of coverage data including the property items data with the associated damages data from the relational database over the internet to the computer device belonging to the policy holder, wherein each said locked value is transmitted only after the claims adjuster locks one of the property insurance claim decisions among a plurality of the property insurance claim decisions for a claim of the property insurance policy of the policy holder associated with the locked values for the data transmitted in steps (a), (d) and (f).

5. A method of visually presenting property insurance claim decisions according to claim 1, further comprising the steps of
   (h) displaying a plurality of hyperlinks associated with each of the entries in the list of property items with the associated damages data on the itemization of coverage in the first view on the display screen of the computer device belonging to the policy holder;
   (i) transmitting pages of documents over the internet from the relational database by the processor on the server belonging to the insurer to the computer device belonging to the policy holder, each of the pages of the documents related to a corresponding entry in the list of property items with associated damages on the itemization of coverage; and
   (j) displaying pages of the documents transmitted in said step (i) in one of a plurality of document description sets in a document description set window in a fourth view on the computer device belonging to the policy holder, wherein each of the displayed pages of the documents transmitted in said step (i) correspond to a selected one of the hyperlinks associated with the property items with the associated damages data on the itemization of coverage selected by the policy holder in the third view.

6. A method of visually presenting property insurance claim decisions according to claim 5, wherein said step (i)

of transmitting pages of documents by the processor on the server belonging to the insurer transmits only certain locked pages of the documents over the internet to the computer device belonging to the policy holder only after the claims adjuster locks the certain pages associated with corresponding payments for one property insurance claim decision among a plurality of the property insurance claim decisions for a claim of the property insurance policy of the policy holder.

7. A method of visually presenting property insurance claim decisions according to claim 5, further comprising the steps of
   (k) displaying a full listing of all of the property items in the document description sets in a single view on the display screen of the computer device belonging to the policy holder using the property items data;
   (l) displaying a hyperlink associated with each of the property items on the full listing of the property items in the single view on the display screen of the computer device belonging to the policy holder; and
   (m) displaying an itemization of coverage illustrating selected property items with associated damages in the third view on the display screen of the computer device belonging to the policy holder using the itemization of coverage data including the property items data and the associated damages data transmitted in said step (f) corresponding to a selected one of the hyperlinks associated with a selected one of the property items selected in the single view on the full listing of the property items by the policy holder on the computer device belonging to the policy holder.

8. A method of visually presenting property insurance claim decisions according to claim 1, wherein the subtractions displayed in said step (e) in the second view on the display screen of the computer device belonging to the policy holder include representations of depreciation and a cumulative sum of payments made prior to the selected one of the payments.

9. A method of visually presenting property insurance claim decisions according to claim 1, wherein the policy holder includes a user of the computer device who is an agent of the policy holder.

10. A method of visually presenting property insurance claim decisions according to claim 1, wherein said at least one of said steps of displaying a hyperlink comprises the substep of displaying the hyperlink as a button image.

11. A method of visually presenting property insurance claim decisions according to claim 1, wherein said steps of displaying comprise the substeps of displaying in a web browser at least the first view and the second view and the third view on the display screen of the computer device belonging to the policy holder.

12. A system for visually presenting property insurance claim decisions input into a server by a claims adjuster for audit by a policy holder of a property insurance policy, the system comprising:
   a server belonging to an insurer comprising a relational database storing payment list data of the property insurance claim to transmit the payment list data over an internet from the relational database by a processor on the server;
   a computer device belonging to the policy holder comprising a display screen operatively coupled to the server over the internet to receive the payment list data over the internet from the relational database by the processor on the server and to display a payment list illustrating a plurality of property insurance claim payments in a first view on the display screen of the computer device belonging to the policy holder using the payment list data;
   wherein the computer device belonging to the policy holder displays hyperlinks associated with each payment on the payment list in the first view on the display screen of the computer device belonging to the policy holder;
   wherein the server belonging to an insurer transmits itemized statement of loss data over the internet from the relational database by the processor on the server belonging to the insurer to the computer device belonging to the policy holder, the itemized statement of loss data including replacement cost value data and subtraction data therefrom applicable to the property insurance policy;
   wherein the computer device belonging to the policy holder displays an itemized statement of loss illustrating the replacement cost value and subtractions therefrom in a second view on the display screen of the computer device belonging to the policy holder using the itemized statement of loss data including the replacement cost value data and the subtraction data therefrom corresponding to a selected one of the hyperlinks associated with a selected one of the payments selected in the first view by the policy holder on the computer device belonging to the policy holder;
   wherein the server belonging to an insurer transmits itemization of coverage data over the internet from the relational database by the processor on the server belonging to the insurer to the computer device belonging to the policy holder, the itemization of coverage data including property items data and associated damages data applicable to the property insurance policy; and
   wherein the computer device belonging to the policy holder displays an itemization of coverage illustrating a list of property items with associated damages corresponding to each of the property items in a third view on the display screen of the computer device belonging to the policy holder using the itemization of coverage data including the property items data and the associated damages data, wherein only a subset of the property items with the associated damages are listed in the third view that correspond to the payment chosen by the selected one of the hyperlinks associated with the selected one of the payments displayed in the first view by the policy holder on the computer device belonging to the policy holder.

13. A system for visually presenting property insurance claim decisions according to claim 12,
   wherein the computer device belonging to the policy holder further displays a hyperlink associated with the itemized statement of loss in the second view on the display screen of the computer device belonging to the policy holder; and
   wherein the computer device belonging to the policy holder displays the itemization of coverage by further displaying the itemization of coverage illustrating property items with associated damages data in the third view on the display screen of the computer device belonging to the policy holder using the itemization of coverage data including the property items data and the associated damages data further corresponding to the hyperlink associated with the itemized statement of loss selected in the second view by the policy holder on the computer device belonging to the policy holder.

14. A system for visually presenting property insurance claim decisions according to claim 13, wherein the damages data displayed in the third view on the display screen of the computer device belonging to the policy holder include representations of replacement cost and depreciation.

15. A system for visually presenting property insurance claim decisions according to claim 12, wherein the server belonging to the insurer is operatively coupled to the internet to transmit from the relational database only a locked value for each of the payments in the payment list data and to transmit only a locked value for each entry in the itemized statement of loss data including the replacement cost value data and the subtraction data therefrom and to transmit only a locked value for each entry in the itemization of coverage data including the property items data with the associated damages data to the computer device belonging to the policy holder, wherein each said locked value is transmitted only after the claims adjuster locks one of the property insurance claim decisions among a plurality of the property insurance claim decisions for a claim of the property insurance policy of the policy holder.

16. A system for visually presenting property insurance claim decisions according to claim 12,
wherein the computer device belonging to the policy holder displays a plurality of hyperlinks associated with each of the entries in the list of property items with associated damages data on the itemization of coverage in the first view on the display screen of the computer device belonging to the policy holder;
wherein the server belonging to an insurer transmits pages of documents over the internet from the relational database by the processor on the server belonging to the insurer to the computer device belonging to the policy holder, each of the pages of the documents related to a corresponding entry in the list of property items with associated damages on the itemization of coverage; and
wherein the computer device belonging to the policy holder displays pages of the documents in one of a plurality of document description sets in a document description set window in a fourth view on the computer device belonging to the policy holder, wherein each of the displayed pages of the documents transmitted correspond to a selected one of the hyperlinks associated with the property items with the associated damages data on the itemization of coverage selected by the policy holder in the third view.

17. A system for visually presenting property insurance claim decisions according to claim 15, wherein the server belonging to the insurer transmits only certain locked pages of the documents over the internet to the computer device belonging to the policy holder only after the claims adjuster locks the certain pages associated with corresponding payments for one property insurance claim decision among a plurality of the property insurance claim decisions for a claim of the property insurance policy of the policy holder.

18. A system for visually presenting property insurance claim decisions according to claim 16,
wherein the computer device belonging to the policy holder displays a full listing of all of the property items in the document description sets in a single view on the display screen of the computer device belonging to the policy holder using the property items data;
wherein the computer device belonging to the policy holder displays a hyperlink associated with each of the property items on the full listing of the property items in the single view on the display screen of the computer device belonging to the policy holder; and
wherein the computer device belonging to the policy holder displays an itemization of coverage illustrating selected property items with associated damages in the third view on the display screen of the computer device belonging to the policy holder using the itemization of coverage data including the property items data and the associated damages data corresponding to a selected one of the hyperlinks associated with a selected one of the property items selected in the single view on the full listing of the property items by the policy holder on the computer device belonging to the policy holder.

19. A system for visually presenting property insurance claim decisions according to claim 12, wherein the subtractions displayed in the second view on the display screen of the computer device belonging to the policy holder include representations of depreciation and a cumulative sum of payments made prior of the selected one of the payments.

20. A system for visually presenting property insurance claim decisions according to claim 12, wherein the policy holder includes a user of the computer device who is an agent of the policy holder.

21. A system for visually presenting property insurance claim decisions according to claim 12, wherein at least one of the hyperlinks displayed is displayed as a button image.

22. A system for visually presenting property insurance claim decisions according to claim 12, wherein the computer device belonging to the policy holder displays in a web browser at least the first view and the second view and the third view on the display screen of the computer device belonging to the policy holder.

* * * * *